US009688784B2

(12) United States Patent
Okel et al.

(10) Patent No.: US 9,688,784 B2
(45) Date of Patent: Jun. 27, 2017

(54) TREATED FILLERS, COMPOSITIONS CONTAINING SAME, AND ARTICLES PREPARED THEREFROM

(71) Applicant: PPG Industries Ohio, Inc., Cleveland, OH (US)

(72) Inventors: Timothy Allen Okel, Trafford, PA (US); Peter Lawrence Votruba-Drzal, Pittsburgh, PA (US); Justin Jonathan Martin, Irwin, PA (US); Raphael O. Kollah, Wexford, PA (US); Truman Wilt, Clinton, PA (US); Brian K. Rearick, Allison Park, PA (US); Clint Steven Edelman, Pittsburgh, PA (US); Linda K. Anderson, Allison Park, PA (US); Feng Wang, Export, PA (US); Kurt G. Olson, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/508,411

(22) Filed: Oct. 7, 2014

(65) Prior Publication Data
US 2015/0126657 A1    May 7, 2015

Related U.S. Application Data

(60) Provisional application No. 61/887,713, filed on Oct. 7, 2013.

(51) Int. Cl.
| | |
|---|---|
| *C09C 1/30* | (2006.01) |
| *C08F 8/42* | (2006.01) |
| *C08K 9/04* | (2006.01) |
| *C09C 3/00* | (2006.01) |
| *C09C 3/12* | (2006.01) |
| *C09C 3/10* | (2006.01) |
| *C09C 3/08* | (2006.01) |
| *C08K 5/09* | (2006.01) |
| *C08L 7/02* | (2006.01) |
| *C08L 9/08* | (2006.01) |
| *C08L 33/02* | (2006.01) |

(52) U.S. Cl.
CPC .................. *C08F 8/42* (2013.01); *C08K 5/09* (2013.01); *C08K 9/04* (2013.01); *C08L 7/02* (2013.01); *C08L 9/08* (2013.01); *C08L 33/02* (2013.01); *C09C 1/309* (2013.01); *C09C 1/3063* (2013.01); *C09C 1/3072* (2013.01); *C09C 1/3081* (2013.01); *C09C 3/006* (2013.01); *C09C 3/08* (2013.01); *C09C 3/10* (2013.01); *C09C 3/12* (2013.01); *C01P 2006/12* (2013.01); *C01P 2006/22* (2013.01); *C01P 2006/80* (2013.01)

(58) Field of Classification Search
CPC ................................................ C09C 1/3072
See application file for complete search history.

(56) References Cited

U.S. PATENT DOCUMENTS

| | | | |
|---|---|---|---|
| 2,940,830 A | * | 6/1960 | Thornhill ............... B82Y 30/00 |
| | | | 106/482 |
| 3,004,936 A | | 10/1961 | Howland et al. |
| 3,873,489 A | | 3/1975 | Thurn et al. |
| 3,994,742 A | * | 11/1976 | Russell ................. B60C 1/0016 |
| | | | 106/481 |
| 4,328,041 A | | 5/1982 | Wilson |
| 4,348,311 A | | 9/1982 | Machurat et al. |
| 4,530,959 A | | 7/1985 | Armbruster et al. |
| 4,616,065 A | | 10/1986 | Hargis et al. |
| 4,748,199 A | | 5/1988 | Takiguchi et al. |
| 4,866,131 A | | 9/1989 | Fujimaki et al. |
| 4,894,420 A | | 1/1990 | Scriver |
| 4,908,396 A | * | 3/1990 | Evans ...................... C08K 9/08 |
| | | | 523/202 |
| 4,925,894 A | | 5/1990 | Futamura |
| 5,082,901 A | | 1/1992 | Linster |
| 5,162,409 A | | 11/1992 | Mroczkowski |

(Continued)

FOREIGN PATENT DOCUMENTS

| | | | |
|---|---|---|---|
| CN | 103073754 A | | 5/2013 |
| EP | 0 007 190 A | * | 1/1980 |
| EP | 1362884 A1 | | 11/2003 |
| JP | 2007308608 A | | 11/2007 |
| JP | 2009019098 A | | 1/2009 |
| JP | 2009062274 A | | 3/2009 |
| JP | 2011079912 A | | 4/2011 |
| JP | 2012187635 A | | 10/2012 |
| WO | 2006125927 A1 | | 11/2006 |
| WO | 2013043955 A1 | | 3/2013 |
| WO | 2013129394 A1 | | 7/2015 |

OTHER PUBLICATIONS

Bonilla-Cruz et al., "Towards Controlled Graft Polymerization of Poly[styrene-co-(maleic anhydride)] on Functionalized Silica Mediated by Oxoaminium Bromide Salt. Facile Synthetic Pathway Using Nitroxide Chemistry", Macromolecular Rapid Communications, Jul. 2, 2007, pp. 1397-1403, vol. 28.

(Continued)

*Primary Examiner* — Vickey Nerangis
(74) *Attorney, Agent, or Firm* — The Webb Law Firm

(57) ABSTRACT

The present invention includes a process for producing treated filler that includes (a) treating a slurry that includes untreated filler where the untreated filler has not been previously dried, with a treating composition that includes a treating agent, thereby forming a treated filler slurry, and (b) drying the treated filler slurry to produce treated filler. The treating agent can include a polymer having (i) at least one first group that interacts with the untreated filler and (ii) at least one second group that interacts with a rubber matrix into which the treated filler is incorporated. The present invention also is directed to treated filler prepared by the process, as well as rubber compounding compositions and tires including the treated filler.

28 Claims, No Drawings

(56) References Cited

U.S. PATENT DOCUMENTS

| | | | |
|---|---|---|---|
| 5,580,919 | A | 12/1996 | Agostini et al. |
| 5,616,316 | A | 4/1997 | Persello |
| 5,708,053 | A * | 1/1998 | Jalics .................. C08C 19/44 |
| | | | 152/905 |
| 6,296,860 | B1 | 10/2001 | Hasegawa et al. |
| 7,001,673 | B2 * | 2/2006 | Yamasaki ............. B41N 3/036 |
| | | | 101/457 |
| 7,569,107 | B2 | 8/2009 | Boyer et al. |
| 2003/0135006 | A1 | 7/2003 | Materne et al. |
| 2004/0030028 | A1 | 2/2004 | Resendes et al. |
| 2006/0281009 | A1 | 12/2006 | Boyer et al. |
| 2008/0223494 | A1 * | 9/2008 | Amino ................ B60C 1/0016 |
| | | | 152/209.1 |
| 2009/0214449 | A1 | 8/2009 | Valero et al. |
| 2010/0261803 | A1 | 10/2010 | Bismarck et al. |
| 2011/0003922 | A1 | 1/2011 | Jiang et al. |
| 2011/0013938 | A1 | 1/2011 | Tonohiro |
| 2011/0136938 | A1 | 6/2011 | Koster et al. |
| 2011/0136970 | A1 | 6/2011 | Koster et al. |
| 2013/0079445 | A1 | 3/2013 | Martin et al. |
| 2015/0031821 | A1 | 1/2015 | Shiono et al. |
| 2015/0110712 | A1 * | 4/2015 | Schmidt .................. C01B 37/02 |
| | | | 423/706 |

OTHER PUBLICATIONS

Ding et al., "Silica nanoparticles encapsulated by polystyrene via surface grafting and in situ emulsion polymerization", Materials Letters, 2004, pp. 3126-3130, vol. 58.

Ghosh et al., "Surface modification of nano-silica with amides and imides for use in polyester nanocomposites", Journal of Materials Chemistry A, Mar. 25, 2013, pp. 6073-6080, vol. 1, XP-002732563.

Mahdavian et al., "Nanocomposite particles with core-shell morphology III: preparation and characterization of nano Al2O3-poly-(styrene-methyl methacrylate) particles via miniemulsion polymerization", Apr. 30, 2009, pp. 329-340, vol. 63, Springer.

Rosen et al., "Surface Functionalization of Silica Nanoparticles with Cysteine: A Low-Fouling Zwitterionic Surface", Jul. 15, 2011, pp. 10507-10513, vol. 27, ACS Publications.

Yoshinaga et al., "Surface modification of fine colloidal silica with copolymer silane-coupling agents composed of maleic anhydride", Colloid Polymer Science, 2002, pp. 85-89, vol. 280, XP-002732564.

Zhou et al., "Preparation and Properties of Poly(styrene-co-maleic anhydride)/Silica Hybrid aterials by the in Situ Sol-Gel Process", Journal of Polymer Science Part A: Polymer Chemistry, 1998, pp. 1607-1613, vol. 36, No. 10, John Wiley & Sons, Inc., XP-002562964.

\* cited by examiner

TREATED FILLERS, COMPOSITIONS CONTAINING SAME, AND ARTICLES PREPARED THEREFROM

CROSS REFERENCE TO RELATED APPLICATIONS

This application claims the benefit of U.S. Provisional Application No. 61/887,713, filed Oct. 7, 2013, which is hereby incorporated herein its entirety by reference.

FIELD OF INVENTION

The present invention is related to a process for the preparation of treated filler, treated filler produced by the process, and compositions and articles containing such treated filler.

BACKGROUND OF THE INVENTION

The use of silica/silane filler systems to reduce the rolling resistance and improve the wet traction of passenger car and truck tires is known in the art. A reduction of rolling resistance results in less fuel consumption.

The simultaneous improvement of rolling resistance, wear, and traction, known as expanding the "magic triangle", requires new approaches to rubber composite development. Precipitated silica has played a major role in the emergence of the green tire, which boasts a large improvement in rolling resistance compared to past technologies. The direct cross-linking of silica (via coupling) into a highly cross-linked polymer matrix, while minimizing interactions between silica particles, is believed to be of vital importance to desirable dynamic mechanical properties of rubber used in the production of passenger car and truck tires. It has been noted that in natural rubber (typically used in the production of truck tires), the proteins present from natural rubber biosynthesis can adsorb preferentially to the silica surface, interfering with the in-situ coupling reaction. Increased dump temperatures, which might improve the coupling efficiency, have also been shown to degrade natural rubber. Thus, there continues to be a need in the rubber industry for improved silica-rubber coupling materials.

Further, it has been found that the incorporation of high surface area filler materials into rubber compositions can cause an undesirable increase in viscosity thereby limiting the amount of high surface area material that can be included in the rubber composition due to process problems. Thus, there is a need to treat such high surface materials (e.g., precipitated silica) with materials which can serve as to render the high surface materials more compatible with the polymeric matrix into which they are being incorporated, improve processing viscosity, and prevent phase separation of the high surface materials from the polymeric matrix.

SUMMARY OF THE INVENTION

In accordance with the present invention, there is provided a process for producing treated filler that includes: (a) treating a slurry that includes untreated filler, where the untreated filler has not been previously dried, with a treating composition that includes a treating agent, thereby forming a treated filler slurry; and (b) drying the treated filler slurry to produce treated filler. The treating agent can include a polymer having (i) at least one first group that interacts with the untreated filler and (ii) at least one second group that interacts with a rubber matrix into which the treated filler is incorporated.

In accordance with the present invention, there is further provided a process for producing treated precipitated silica that includes: (a) combining an alkali metal silicate and an acid to form a slurry that includes untreated silica, where the untreated silica has not been previously dried; (b) treating said slurry with a treating composition that includes a treating agent, thereby forming a treated slurry; and (c) drying said treated slurry to produce treated precipitated silica. The treating agent can include a polymer having (i) at least one first group that interacts with the untreated silica and (ii) at least one second group that interacts with a rubber matrix into which the treated silica is incorporated.

In accordance with the present invention, there is further provided a process for producing a treated precipitated silica that includes: (a) combining an alkali metal silicate and an acid to form an untreated slurry that includes untreated silica, where the untreated silica has not been previously dried; (b) drying the untreated slurry to produce dried precipitated silica; (c) forming an aqueous slurry of the dried precipitated silica with a treating composition that includes a treating agent, and, optionally, a coupling agent and/or, optionally, a non-coupling agent to form a treated precipitated silica slurry; and (d) drying the treated precipitated silica slurry to produce a dried treated precipitated silica. The treating agent can include a polymer having (i) at least one first group that interacts with the untreated silica and (ii) at least one second group that interacts with a rubber matrix into which the treated silica is incorporated.

In accordance with the present invention, there is also provided treated filler prepared by the processes described herein, as well as rubber compounding compositions including the treated filler, and a rubber article that includes the treated filler of the present invention.

DETAILED DESCRIPTION OF THE INVENTION

As previously mentioned, the present invention provides a process for producing treated filler. The process can include: (a) treating a slurry that can include untreated filler where the untreated filler has not been previously dried, with a treating composition comprising a treating agent, thereby forming a treated filler slurry; and (b) drying the treated filler slurry to produce treated filler.

As used herein, with reference to filler (such as, treated and/or untreated filler), the term "not been previously dried" means filler that, prior to the treatment process, has not been dried to a moisture content of less than 20 percent by weight. For purposes of the present invention, untreated filler does not include filler that has been previously dried to a moisture content of less than 20 percent by weight and then rehydrated.

As used herein, the term "filler" means an inorganic material such as an inorganic oxide that can be used in a polymer composition to improve at least one property of the polymer. As used herein, the term "slurry" means a mixture including at least filler and water.

As used herein, the articles "a," "an," and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about."

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), and graft polymers.

As used herein, the term "(meth)acrylate" and similar terms, such as "(meth)acrylic acid ester" means methacrylates and/or acrylates. As used herein, the term "(meth) acrylic acid" means methacrylic acid and/or acrylic acid.

All documents, such as but not limited to issued patents and patent applications, referred to herein, and unless otherwise indicated, are to be considered to be "incorporated by reference" in their entirety.

As used herein, recitations of "linear or branched" groups, such as linear or branched alkyl, are herein understood to include: a methylene group or a methyl group; groups that are linear, such as linear $C_2$-$C_{36}$ alkyl groups; and groups that are appropriately branched, such as branched $C_3$-$C_{36}$ alkyl groups.

As used herein, recitations of "optionally substituted" group, means a group, including but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycyclocalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as $N(R_{11}')(R_{12}')$ where $R_{11}'$ and $R_{12}'$ are each independently selected, with some embodiments, from hydrogen, linear or branched $C_1$-$C_{20}$ alkyl, $C_3$-$C_{12}$ cycloakyl, $C_3$-$C_{12}$ heterocycloalkyl, aryl, and heteroaryl.

Some compounds that can be used with the method of the present invention include groups and sub groups that can in each case be independently selected from hydrocarbyl and/or substituted hydrocarbyl and/or functional hydrocarbyl (or hydrocarbyl groups having one or more functional groups). As used herein, and in accordance with some embodiments, the term "hydrocarbyl" and similar terms, such as "hydrocarbyl substituent," means: linear or branched $C_1$-$C_{36}$ alkyl (e.g., linear or branched $C_1$-$C_{10}$ alkyl); linear or branched $C_2$-$C_{36}$ alkenyl (e.g., linear or branched $C_2$-$C_{10}$ alkenyl); linear or branched $C_2$-$C_{36}$ alkynyl (e.g., linear or branched $C_2$-$C_{10}$ alkynyl); $C_3$-$C_{12}$ cycloalkyl (e.g., $C_3$-$C_{10}$ cycloalkyl); $C_5$-$C_{18}$ aryl (including polycyclic aryl groups) (e.g., $C_5$-$C_{10}$ aryl); and $C_6$-$C_{24}$ aralkyl (e.g., $C_6$-$C_{10}$ aralkyl).

Representative alkyl groups include but are not limited to methyl, ethyl, propyl, isopropyl, butyl, isobutyl, sec-butyl, tert-butyl, pentyl, neopentyl, hexyl, heptyl, octyl, nonyl and decyl. Representative alkenyl groups include but are not limited to vinyl, allyl and propenyl. Representative alkynyl groups include but are not limited to ethynyl, 1 propynyl, 2-propynyl, 1-butynyl, and 2-butynyl. Representative cycloalkyl groups include but are not limited to cyclopropyl, cyclobutyl, cyclopentyl, cyclohexyl, and cyclooctyl substituents. Representative aralkyl groups include but are not limited to benzyl, and phenethyl.

The term "substituted hydrocarbyl" and similar terms, such as "functional hydrocarbyl" (or hydrocarbyl having at least one functional group) as used herein means a hydrocarbyl group in which at least one hydrogen thereof has been substituted with a group that is other than hydrogen, such as, but not limited to, halo groups, hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (e.g., alkyl, alkenyl, alkynyl, cycloalkyl, aryl, and aralkyl groups), heterocycloalkyl groups, heteroaryl groups, and amine groups, such as —$N(R_{11}')(R_{12}')$ where $R11'$ and $R_{12}'$ are each independently selected from hydrogen, hydrocarbyl and substituted hydrocarbyl.

The term "alkyl" as used herein, in accordance with some embodiments, means linear or branched alkyl, such as but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from, include, but are not limited to, those recited previously herein. Alkyl groups of the various compounds of the present invention can, with some embodiments, include one or more unsaturated linkages selected from —CH=CH— groups and/or one or more —C≡C— groups, provided the alkyl group is free of two or more conjugated unsaturated linkages. With some embodiments, the alkyl groups are free of unsaturated linkages, such as CH=CH groups and —C≡C— groups.

The term "cycloalkl" as used herein, in accordance with some embodiments, means groups that are appropriately cyclic, such as but not limited to, $C_3$-$C_{12}$ cycloalkyl (including, but not limited to, cyclic $C_5$-$C_7$ alkyl) groups. Examples of cycloalkyl groups include, but are not limited to, those recited previously herein. The term "cycloalkyl" as used herein in accordance with some embodiments also includes: bridged ring polycycloalkyl groups (or bridged ring polycyclic alkyl groups), such as but not limited to, bicyclo [2.2.1]heptyl (or norbornyl) and bicyclo[2.2.2]octyl; and fused ring polycycloalkyl groups (or fused ring polycyclic alkyl groups), such as, but not limited to, octahydro-1H-indenyl, and decahydronaphthalenyl.

The term "heterocycloalkyl" as used herein, in accordance with some embodiments, means groups that are appropriately cyclic (having at least one heteroatom in the cyclic ring), such as but not limited to, $C_3$-$C_{12}$ heterocycloalkyl groups or $C_5$-$C_7$ heterocycloalkyl groups, and which have at least one hetero atom in the cyclic ring, such as, but not limited to, O, S, N, P, and combinations thereof. Examples of heterocycloalkyl groups include, but are not limited to, imidazolyl, tetrahydrofuranyl, tetrahydropyranyl, and piperidinyl. The term "heterocycloalkyl" as used herein, in accordance with some embodiments, also includes: bridged ring polycyclic heterocycloalkyl groups, such as but not limited to, 7-oxabicyclo[2.2.1]heptanyl; and fused ring polycyclic heterocycloalkyl groups, such as but not limited to, octahydrocyclopenta[b]pyranyl, and octahydro 1H isochromenyl.

As used herein, and in accordance with some embodiments, the term "aryl" includes $C_5$-$C_{18}$ aryl, such as $C_5$-$C_{10}$ aryl (and includes polycyclic aryl groups, including polycyclic fused ring aryl groups). Representative aryl groups include, but are not limited to, phenyl, naphthyl, anthracynyl, and triptycenyl.

The term "heteroaryl," as used herein, in accordance with some embodiments, means aryl groups having at least one heteroatom in the ring, and includes but is not limited to $C_5$-$C_{18}$ heteroaryl, such as but not limited to $C_5$-$C_{10}$ heteroaryl (including fused ring polycyclic heteroaryl groups) and means an aryl group having at least one hetero atom in the aromatic ring, or in at least one aromatic ring in the case of a fused ring polycyclic heteroaryl group. Examples of heteroaryl groups include, but are not limited to, furanyl, pyranyl, pyridinyl, isoquinoline, and pyrimidinyl.

As used herein, the term "fused ring polycyclic-aryl-alkyl group" and similar terms such as, fused ring polycyclic-alkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to indenyl, 9H-flourenyl, cyclopentanaphthenyl, and indacenyl.

The term "aralkyl" as used herein, and in accordance with some embodiments, includes but is not limited to $C_6$-$C_{24}$ aralkyl, such as but not limited to $C_6$-$C_{10}$ aralkyl, and means an aryl group substituted with an alkyl group. Examples of aralkyl groups include, but are not limited to, those recited previously herein.

Suitable untreated fillers for use in process of the present invention can include a wide variety of materials known to one having ordinary skill in the art. Non-limiting examples can include inorganic oxides such as inorganic particulate and amorphous solid materials which possess either oxygen (chemisorbed or covalently bonded) or hydroxyl (bound or free) at an exposed surface, such as but not limited to oxides of the metals in Periods 2, 3, 4, 5 and 6 of Groups Ib, IIb, IIIa, IIIb, IVa, IVb (except carbon), Va, VIa, VIIa and VIII of the Periodic Table of the Elements in Advanced Inorganic Chemistry: A Comprehensive Text by F. Albert Cotton et al, Fourth Edition, John Wiley and Sons, 1980. Non-limiting examples of suitable inorganic oxides can include but are not limited to aluminum silicates, silica such as silica gel, colloidal silica, precipitated silica, and mixtures thereof.

The inorganic oxide can be silica with some embodiments. For example, in certain embodiments, the inorganic oxide can include precipitated silica, colloidal silica, and mixtures thereof. The silica can have an average ultimate particle size of less than 0.1 micron, or greater than 0.001 micron, or from 0.01 to 0.05 micron, or from 0.015 to 0.02 micron, as measured by electron microscope. Further, the silica can have a surface area of from 25 to 1000 square meters per gram, such as from 75 to 250 square meters per gram, or from 100 to 200 square meters per gram, as determined by the Brunauer, Emmett, and Teller (BET) method in accordance with ASTM D1993-91. With some embodiments, the filler is precipitated silica.

As previously mentioned, the untreated filler slurry is treated with a treating composition that can include a treating agent. In certain embodiments, the treating agent can act as a coupling agent. The term "coupling agent" as used herein means a material that binds (ionically or covalently) to (i) groups present on the surface of the filler particle (such as on the silica surface), as well as to (ii) functional groups present on the component(s) of the polymeric matrix into which the filler is incorporated. Thus, the filler particles can be "coupled" to the components in the polymeric matrix.

Alternatively, with some embodiments, the treating agent can act as a non-coupling agent. The term "non-coupling agent" as used herein means a material that serves to compatibilize the treated filler with the polymeric composition in which the treated filler ultimately is used. That is, the non-coupling agent can affect the free surface energy of the treated filler particles to make the treated filler particles have a surface energy similar to that of the polymeric composition. This facilitates incorporation of the treated filler into the polymeric composition, and can serve to improve (such as, decrease) mix viscosity of the composition. It should be noted that non-coupling agents are not expected to couple with the rubber matrix beyond Van der Waal interactions. As used herein, the term "non-coupling agent" can be used interchangeably with "compatibilizer".

It should be noted that many of the treatment agents may simultaneously function as both a coupling agent and a non-coupling agent/compatibilizer.

The treating agent, with some embodiments of the present invention, can include a polymer. Non-limiting examples of suitable polymers include, but are not limited to, acrylic polymers, styrene butadiene latexes, natural rubber latexes, and combinations thereof.

With some embodiments, the acrylic polymer can be selected from acrylic homopolymers and/or acrylic copolymers, and can have a polymer architecture including, but not limited to, a random copolymer architecture, a comb polymer architecture, a block copolymer architecture, and a hyperbranched polymer architecture. The backbone and each tooth of an acrylic comb polymer can each independently have a polymer chain architecture selected from random copolymer chain architecture, block copolymer chain architecture, and homopolymer chain architecture, with some embodiments of the present invention. Thus, the acrylic polymer can include, but is not limited to, acrylic random copolymers, acrylic comb polymers, acrylic block copolymers, hyperbranched acrylic polymers, and combinations thereof.

Acrylic comb polymers and acrylic block copolymers that are used with some embodiments of the present invention can each be independently prepared with art-recognized methods, such as living radical polymerization, such as atom transfer radical polymerization. Acrylic random copolymers and acrylic homopolymers used with some embodiments of the present invention can be prepared by art-recognized methods, such as living radical polymerization and free radical polymerization.

Further, as used herein, the term "hyperbranched acrylic polymer" refers to an acrylic polymer having a main polymer chain and at least two branching points along the main polymer chain. In certain embodiments, the hyperbranched acrylic polymer includes ethylenic unsaturation. As used herein, the term "ethylenic unsaturation" refers collectively to aliphatic carbon-carbon double bonds and aliphatic carbon-carbon triple bonds. Methods and materials for preparing the hyperbranched acrylic polymer are disclosed in U.S. patent application Ser. No. 13/834,804 at paragraphs [0015] to [0024], which disclosure is incorporated by reference herein.

In certain embodiments, the hyperbranched acrylic polymers used as a treating agent exhibit an alpha parameter derived from the Mark-Houwink equation of 0.2 to 0.7, and in some embodiments, the hyperbranched acrylic polymers of the present invention exhibit an alpha parameter derived from the Mark-Houwink equation of 0.3 to 0.6.

The Mark-Houwink relationship between molar mass (M) and intrinsic viscosity ($\eta$) ($[\eta]=K \cdot M\alpha$ provides information about the structure of the polymer. The alpha parameter indicates the degree of branching and can be determined by multi detection size-exclusion chromatography as described by Paillet et al, Journal of Polymer Science Part A: Polymer Chemistry, 2012, 50, 2967-2979, which is incorporated by reference herein.

The hyperbranched acrylic polymer produced in accordance with some embodiments of the present invention can have a weight average molecular weight (Mw) between 10,000 and 200,000, such as between 15,000 and 150,000, and in certain embodiments, between 20,000 and 100,000 grams per mole. Further, in certain embodiments, the hyperbranched acrylic polymers of the present invention are water-dispersible. As used herein, the term "water-dispersible" means that a material may be dispersed in water without the aid or use of a surfactant, such as but not limited to, a surfactant monomer. As used herein, the term "surfactant monomers" refers to monomers that when added to water reduces the surface tension of water. As such, in certain embodiments, the hyperbranched acrylic polymers used in the practice of the invention can be substantially free, can be essentially free, and can be completely free of surfactant monomers. The term "substantially free" as used in this context means the hyperbranched acrylic polymers contain less than 1000 parts per million (ppm), "essentially free" means less than 100 ppm, and "completely free" means less than 20 parts per billion (ppb) of a surfactant monomer.

In certain embodiments, the hyperbranched acrylic polymer is dispersed with at least one ethylenically unsaturated monomer and polymerized to at least encapsulate the untreated filler, such as in a microgel. As used herein, the term "microgel" refers to internally crosslinked micro-sized polymer and the term "partially encapsulate" refers to treated fillers that are at least partially confined or enclosed within a microgel. Suitable polymerization techniques for forming the microgel are disclosed in U.S. patent application Ser. No. 13/834,804 at paragraphs [0050] to [0052] and the Examples section, all of which are incorporated by reference herein.

Further, the ethylenically unsaturated monomers can be monoethylenically unsaturated monomers, polyethylenically unsaturated monomers, or mixtures thereof. In certain embodiments, the ethylenically unsaturated monomers are hydrophobic ethylenically unsaturated monomers. As used herein, "hydrophobic monomers" refers to monomers that do not have an affinity for water and do not to dissolve in, mix with, or swell in a water or aqueous medium. Non-limiting examples of monoethylenically and polyethylenically unsaturated monomers used to prepare the microgels in accordance with some embodiments of the present invention include, but are not limited to, any of the hydrophobic monoethylenically and polyethylenically unsaturated monomers previously discussed. For example, suitable ethylenically unsaturated monomers include, but are not limited to, methyl methacrylate, n-butyl acrylate, isobutyl acrylate, tert-butyl acrylate, and ethyleneglycol dimethacrylate.

As previously mentioned, the treating agent can, with some embodiments, include styrene butadiene latexes and/or natural rubber latexes. "Styrene butadiene latexes" refers to stable dispersions of styrene butadiene polymers. Further, as used herein, a "natural rubber latex" refers to a stable dispersion of a rubber which includes, as a main backbone, polyisoprene obtained from sap produced by plant species such as, but not limited to, *Hevea brasiliensis, Parthenoim argentatum*, and/or *Sapotaceae*. In certain embodiments, the natural rubber latex includes cis-1,4-polyisoprene.

With some embodiments of the present invention, the treating agent can include a polymer (such as any of the polymers previously described) having at least one first group that interacts with the untreated filler and at least one second group that interacts with a rubber matrix into which the treated filler is incorporated. As used herein, the term "interacts" means that the at least one first group and the at least one second group binds ionically and/or covalently to the untreated filler and rubber matrix, respectively. With some embodiments, the at least one first group interacts with the untreated filler by binding ionically and/or covalently to the surface of the untreated filler. With some other embodiments, the at least one second group interacts with a rubber matrix by binding covalently with at least a portion of the matrix.

The at least one first group includes, with some embodiments, esters, carboxylic acids, imides including cyclic imides, anhydrides including cyclic anhydrides, diacids, lactones, oxiranes, isocyanates, alkoxysilanes, and/or derivatives thereof. As used herein, the term "derivatives thereof" refers to salts and hydrolysis products of such groups.

The at least one second group can be the same or different from the at least one first group. With some embodiments, the at least one second group includes formyl, keto, thiol, sulfido, halo, amino, alkenyl, alkynyl, alkyl such as a $C_3$-$C_{36}$ alkyl, and/or derivatives thereof. Keto groups from which the second group can be selected can be represented by the formula —C(O)(R'), where R' is a hydrocarbyl group, which can be selected from those classes and examples of hydrocarbyl groups described previously herein. With some other embodiments, the at least one second group includes hydroxyl, anhydrides including cyclic anhydrides, oxiranes, and/or derivatives thereof.

With some embodiments, the treating agent can include a polymer (such as any of the polymers previously described) having at least one first group and/or at least one second group selected from an anhydride and/or derivatives thereof. Non-limiting examples of suitable anhydrides and derivatives thereof include, but are not limited to, maleic anhydride, maleimide, and combinations thereof. Such anhydride functional polymers include residues of maleic anhydride and/or derivatives thereof, which can be referred to as maleated polymers. Suitable maleated polymers and latexes thereof are commercially available from Westlake Chemical under the trade name EPOLENE®.

With some embodiments, the anhydride functional polymers and/or derivatives thereof can be prepared from a maleimide monomer represented by the following formula (A):

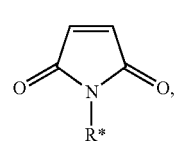

(A)

where R* is hydrogen, or $C_1$ to $C_{10}$ hydrocarbyls.

With some other embodiments, the anhydride functional polymer and/or derivative thereof is prepared from maleic anhydride, and after formation thereof, at least one some of the maleic anhydride residues in the polymer are converted to maleimide groups by reaction with an amine followed by dehydration in accordance with art-recognized methods.

As previously described, the treating agent can include a styrene butadiene latex having at least one first group and at least one second group. With some of these embodiments, the at least one first group is selected from a carboxylic acid and/or a derivative thereof. Suitable carboxylated styrene butadiene latexes include, but are not limited to, those commercially available from Kraton Performance Polymers, Inc. and OMNOVA Solutions Inc.

With some embodiments, in addition to the treatment agents listed above, the treating composition can further include a first or additional coupling agent that is different than the treating agent. In certain embodiments, the coupling agent can include any of a variety of organosilanes. Examples of suitable organosilanes that can be used with some embodiments of the present invention include those represented by Formula (I):

$(R_1)_a(R_2)_b SiX_{4-a-b}$ (I).

With reference to Formula (I), $R_1$ is independently for each "a", a hydrocarbyl group having 1 to 36 carbon atoms and a functional group. The functional group of the hydrocarbyl group is vinyl, allyl, hexenyl, epoxy (oxirane), glycidoxy, (meth)acryloxy, sulfide, isocyanato (—NCO), polysulfide, mercapto, or halogen. With reference to Formula (I), $R_2$ is independently for each "b" a hydrocarbyl group having from 1 to 36 carbon atoms or hydrogen. X of Formula (I) is independently halogen or alkoxy having 1 to 36 carbon atoms; subscript "a" is 0, 1, 2, or 3; subscript "b" is 0, 1, or 2; (a+b) is 1, 2, or 3. With some embodiments, there is the proviso that when b is 1, (a+b) is 2 or 3. With some further embodiments of the present invention, the treating composition further a coupling agent represented by Formula (I), in which X is alkoxy; a is 1; b is 0; and the functional group of the hydrocarbyl of $R_1$, is halogen.

Examples of halo-functional organosilanes, such as those represented by Formula (I), include, but are not limited to, (4-chloromethyl-phenyl) trimethoxysilane, (4-chloromethyl-phenyl) triethoxysilane, [2-(4-chloromethyl-phenyl)-ethyl]trimethoxysilane, [2-(4-chloromethyl-phenyl)-ethyl] triethoxysilane, (3-chloro-propenyl)-trimethoxysilane, (3-chloro-propenyl)-triethoxysilane, (3-chloro-propyl)-triethoxysilane, (3-chloro-propyl)-trimethoxysilane, trimethoxy-(2-p-tolyl-ethyl)silane and/or triethoxy-(2-p-tolyl-ethyl)silane.

In certain embodiments, the additional coupling agent can be present in the slurry in an amount ranging from 0.25 to 30.0 weight percent, such as 1 to 15 weight percent, or 5 to 10 weight percent based on the total mass of $SiO_2$ which has been precipitated.

In certain embodiments, the treating composition useful in the process of the present invention also can further include a sulfur-containing organosilane that is different from the aforementioned optional organosilane coupling agents, such as represented by Formula (I). Non-limiting examples of such materials can include, but are not limited to, organosilanes represented by the following Formula (II):

$(R_3)_c(R_4)_d SiY_{4-c-d}$ (II).

With reference to Formula (II), $R_3$ independently for each "c" can be a hydrocarbyl group having 1 to 12 carbon atoms and a functional group. The functional group can be sulfide, polysulfide or mercapto. With reference to Formula (II), $R_4$ independently for each "d" can be a hydrocarbyl group having from 1 to 18 carbon atoms or hydrogen. Each Y each can independently be halogen or an alkoxy group having 1 to 12 carbon atoms. Subscript "c" can be 0, 1, 2, or 3; subscript "b" can be 0, 1, or 2; and c+d can be 1, 2, or 3. With some embodiments, there is the proviso that when b is 1 then a+b is 2 or 3. The $R_3$ and $R_4$ groups of Formula (II) can be selected such that they can react with the polymeric composition in which the treated filler can be incorporated. Additionally, the sulfur-containing organosilane can include bis(alkoxysilylalkyl)polysulfides represented by following Formula (III):

$Z'\text{-alk-}S_{n'}\text{-alk-}Z'$ (III).

With reference to Formula (III), "alk" represents a divalent hydrocarbon radical having from 1 to 18 carbon atoms; n' is an integer from 2 to 12; and Z' is:

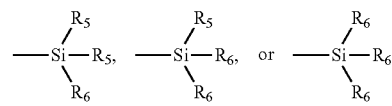

in which $R_5$ is independently an alkyl group having from 1 to 4 carbon atoms or phenyl, and each $R_6$ is independently an alkoxy group having from 1 to 8 carbon atoms, a cycloalkoxy group with from 5 to 8 carbon atoms, or a straight or branched chain alkylmercapto group with from 1 to 8 carbon atoms. The $R_5$ and $R_6$ groups can be the same or different. Also, the divalent alk group can be straight or branched chain, a saturated or unsaturated aliphatic hydrocarbon group or a cyclic hydrocarbon group. Non-limiting examples of bis(alkoxysilylalkyl)-polysulfides can include bis(2-trialkoxysilylethyl)-polysulfides in which the trialkoxy group can be trimethoxy, triethoxy, tri(methylethoxy), tripropoxy, tributoxy, etc. up to trioctyloxy and the polysulfide can be either di-, tri-, tetra-, penta-, or hexasulfide, or mixtures thereof. Further non-limiting examples can include the corresponding bis(3-trialkoxysilylpropyl)-, bis(3-trialkoxysilylisobutyl), -bis(4-trialkoxysilylbutyl)-, etc. up to bis(6-trialkoxysilyl-hexyl)-polysulfides. Further non-limiting examples of bis(alkoxysilylalkyl)-polysulfides are described in U.S. Pat. No. 3,873,489, column 6, lines 5-55, and in U.S. Pat. No. 5,580,919, at column 11, lines 11-41. Further non-limiting examples of such compounds can include: 3,3'bis(trimethoxysilylpropyl)disulfide,
3,3'-bis(triethoxysilylpropyl)tetrasulfide,
3,3'-bis(trimethoxysilylpropyl)tetrasulfide, 2,2'-bis(triethoxysilylethyl)tetrasulfide,
3,3'-bis(trimethoxysilylpropyl)trisulfide, 3,3'-bis(triethoxysilylpropyl)trisulfide,
3,3'-bis(tributoxysilylpropyl)disulfide, 3,3'-bis(trimethoxysilylpropyl)hexasulfide, and
3,3'-bis(trioctoxysilylpropyl)tetrasulfide and mixtures thereof.

The sulfur-containing organosilane also can be a mercapto-organometallic compound represented by the following Formula (IV):

With reference to Formula (IV), M' is silicon, L is halogen or —$OR_8$, Q is hydrogen, $C_1$-$C_{12}$ alkyl, or halo-substituted $C_1$-$C_{12}$ alkyl, $R_7$ is $C_1$-$C_{12}$ alkylene, $R_8$ is $C_1$-$C_{12}$ alkyl or alkoxyalkyl containing from 2 to 12 carbon atoms, the halogen or (halo) groups being chloro, bromo, iodo or fluoro, and n is 1, 2 or 3. In a non-limiting embodiment, mercaptoorganometallic reactants having two mercapto groups can be used.

Non-limiting examples of useful mercaptoorganometallic compounds include but are not limited to mercaptomethyltrimethoxysilane, mercaptoethyltrimethoxysilane, mercaptopropyltrimethoxysilane, mercaptomethyltriethoxysilane, mercaptoethyltripropoxysilane, mercaptopropyltriethoxysilane, (mercaptomethyl)dimethylethoxysilane, (mercaptomethyl)methyldiethoxysilane, 3-mercaptopropyl-methyldimethoxysilane, and mixtures thereof.

With some embodiments of the present invention, the sulfur-containing organosilane can be a mercaptoorganometallic compound such as a mercaptosilane different from the organosilane used in the treating composition of step (a), for example, mercaptopropyltrimethoxysilane and/or mercaptomethyltriethoxysilane.

Also, it is contemplated that the sulfur-containing organosilane represented by Formula (IV), which is different from the aforementioned organosilane coupling agent represented by Formula (I), that can be used in step (a) of the process of the present invention, can be a mercaptoorganometallic compound in which the mercapto group is blocked, i.e., the mercapto hydrogen atom is replaced by another group. Blocked mercaptoorganometallic compounds can have an unsaturated heteroatom or carbon bound directly to sulfur via a single bond. Non-limiting examples of specific blocking groups can include thiocarboxylate ester, dithiocarbamate ester, thiosulfonate ester, thiosulfate ester, thiophosphate ester, thiophosphonate ester, and thiophosphinate ester.

With some non-limiting embodiments, in which a blocked mercaptoorganometallic compound is used as an optional coupling material, a deblocking agent can be added to the polymeric compound mixture to deblock the blocked mercaptoorganometallic compound. With some non-limiting embodiments in which water and/or alcohol are present in the mixture, a catalyst, such as, tertiary amines, Lewis acids or thiols, can be used to initiate and promote the loss of the blocking group by hydrolysis or alcoholysis to liberate the corresponding mercaptoorganometallic compounds. Non-limiting examples of blocked mercaptosilanes can include but are not limited to 2-triethoxysilyl-1-ethyl thioacetate, 3-trimethoxy-silyl-1-propyl thiooctoate, bis-(3-triethoxysilyl-1-propyl)-methyldithiophosphonate, 3-triethoxysilyl-1-propyldimethylthiophosphinate, 3-triethoxysilyl-1-propyl-methylthiosulfate, 3-triethoxysilyl-1-propyltoluenethiosulfonate, and mixtures thereof.

The amount of these optional sulfur-containing organosilanes can vary widely and can depend upon the particular material selected. For example, the amount of these optional sulfur-containing organosilanes can be greater than 0.1% based on the weight of untreated filler, such as from 0.5% to 25% based on the weight of untreated filler, or from 1% to 20%, or from 2% to 15%.

In certain embodiments, the treating composition can further include a halo-functional organosilane, which includes a monomeric, dimeric, oligomeric and/or or polymeric compound possessing halogen functionality and alkanedioxysilyl functionality derived from: (i) polyhydroxyl-containing compounds in which the alkanedioxy group is covalently bonded to a single Si atom through Si—O bonds to form a ring; and/or (ii) the alkanedioxy groups are covalently bonded to at least two Si atoms through Si—O bonds to form a dimer, oligomer, or polymer in which adjacent silyl units are bonded to each other through bridged alkanealkoxy structures. Such halo-functional organosilanes are described in detail in United States Published Patent Application No. 2011/0003922A1, published Jan. 6, 2011, at paragraphs [0020] to [0057], the cited portions of which are incorporated by reference herein.

Mixtures of any of the aforementioned coupling agents can be used in the process of the present invention.

With some embodiments, in addition to treating agent described previously herein, the treating composition can optionally further include a first or additional non-coupling agent/compatibilizer that is different from the treating agent. The additional non-coupling agent/compatibilizer can be selected from saturated biopolymers, saturated fatty acids, saturated organic acids, saturated polymer emulsions, saturated polymer coating composition, and mixtures thereof. The additional non-coupling agent/compatibilizer can alternatively or further include a surfactant selected from anionic, nonionic and amphoteric surfactants, and mixtures thereof.

The additional non-coupling agent/compatibilizer can, with some embodiments, be present in an amount of from greater than 1% to 25% by weight based on the total weight of untreated filler, such as the total mass of $SiO_2$ which has been precipitated. For example, the additional non-coupling agent/compatibilizer can be chosen from salts of fatty acids, alkyl sarcosinates, salts of alkyl sarcosinates, and mixtures thereof. Specific non-limiting examples of such can be found in U.S. Pat. No. 7,569,107 at column 5, line 9, to column 7, line 21, the cited portions of which are incorporated by reference herein. With some embodiments of the present invention, the additional non-coupling agent/compatibilizer can include one or more anionic surfactants selected from sodium stearate, ammonium stearate, ammonium cocoate, sodium laurate, sodium cocyl sarcosinate, sodium lauroyl sarconsinate, sodium soap of tallow, sodium soap of coconut, sodium myristoyl sarcosinate, and/or stearoyl sarcosine acid.

The additional non-coupling agent/compatibilizer, with some embodiments, is present in an amount of from greater than 1% up to and including 25% by weight, for example 2.0% to 20.0%, or 4% to 15%, or 5% to 12% by weight based on the total weight of the untreated filler, such as total mass of $SiO_2$ that has been precipitated.

With some embodiments, the additional non-coupling agent/compatibilizer can be a non-coupling organosilane. Non-limiting examples of non-coupling silanes from which the additional non-coupling agent/compatibilizer can selected, with some embodiments, include octadecyltriethoxysilane, octadecyltrichlorosilane, octadecyltrimethoxysilane, propyltriethoxysilane, propyltrimethoxysilane, propyltrichlorosilane, n-octyltrimethoxysilane, n-octyltriethoxysilane, n-octyltrichlorosilane, n-hexyltrimethoxysilane, n-hexyltriethoxysilane, and/or n-hexyltrichlorosilane.

It should be understood that for purposes of the present invention, any of the aforementioned organosilanes, including the organosilane having the structure (I) as described above, can, with some embodiments, include partial hydrolyzates thereof.

The untreated filler used with various embodiments of the present invention, can be prepared using any of a variety of art-recognized methods. For example, in the instance where the untreated filler is untreated silica, the untreated filler can prepared by combining an aqueous solution of soluble metal silicate with acid solution to form a silica slurry; the silica slurry optionally can be aged; acid or base can be added to the optionally aged silica slurry to adjust pH of the slurry; the silica slurry can be filtered, optionally washed, and then dried using art-recognized techniques. A treatment composition such as any of those described above can be added at any step in the above-described process prior to drying in accordance with various embodiments of the present invention.

With some alternative embodiments, the present invention is directed to a process for producing a treated precipitated silica that includes:

(a) combining alkali metal silicate and acid to form an untreated slurry;

(b) optionally, treating the untreated slurry with the treating composition including the treating agent to form a treated slurry;

(c) drying the untreated slurry of (a), or drying the treated slurry of (b), to in each case produce dried precipitated silica;

(d) forming an aqueous slurry of the dried precipitated silica of step (c) with the treatment composition that includes the treating agent to form a treated silica slurry; and (e) drying the treated silica slurry to produce a dried treated precipitated silica.

With some embodiments and with reference to the above-summarized process, whether or not a treatment composition has been included in the untreated slurry prior to drying, an aqueous slurry of the dried precipitated silica (treated or untreated) can be prepared, and a treatment composition can then be added to form a treated slurry of precipitated silica, which is subsequently re-dried to produce a treated precipitated silica.

Additionally the precipitated silica of any of the foregoing embodiments can be included in a polymer blend and compounded with a treatment composition as described previously herein.

Further detailed descriptions of the process for forming the treated silica can be found herein below in the Examples.

Suitable metal silicates that can be used with some embodiments of the present invention can include a wide variety of materials known in the art. Non-limiting examples can include but are not limited to alumina silicate, lithium silicate, sodium silicate, potassium silicate, and mixtures thereof. The metal silicate can be represented by the following structural formula: $M_2O(SiO2)x$ wherein M can be alumina, lithium, sodium or, potassium, and x can range from 0.1 to 4.

Suitable acids that can be used with some embodiments of the present invention can be selected from a wide variety of acids known in the art. Non-limiting examples can include but are not limited to mineral acids, organic acids, carbon dioxide, sulfuric acid, and mixtures thereof.

The treated fillers which are prepared by the processes of the present invention are suitable for inclusion in organic polymeric compositions. The treated filler materials prepared by the process of the present invention are useful with some embodiments in rubber compounding compositions, such as rubber compositions used in the manufacture of tires and tire components such as tire treads.

Polymeric compositions into which treated fillers prepared according with the method of the present invention include, but are not limited to, those described in *Kirk Othmer Encyclopedia of Chemical Technology*, Fourth Edition, 1996, Volume 19, pp 881-904, which description is herein incorporated by reference. The treated filler prepared in accordance with various embodiments of the present invention can be admixed with the polymer or the polymerizable components thereof while the physical form of the polymer or polymerizable components is in any liquid or compoundable form such as a solution, suspension, latex, dispersion, and the like. The polymeric compositions containing the treated filler of the present invention can be milled, mixed, molded and, optionally, cured, by any manner known in the art, to form a polymeric article. Classes of polymers can include but are not limited to thermoplastic and thermosetting resins, rubber compounds and other polymers having elastomeric properties.

The aforementioned polymers can include, for example, alkyd resins, oil modified alkyd resins, unsaturated polyesters, natural oils (e.g., linseed, tung, soybean), epoxides, nylons, thermoplastic polyester (e.g., polyethyleneterephthalate, polybutyleneterephthalate), polycarbonates, i.e., thermoplastic and thermoset, polyethylenes, polybutylenes, polystyrenes, polypropylenes, ethylene propylene co- and terpolymers, acrylics (homopolymer and copolymers of acrylic acid, acrylates, mathacrylates, acrylamides, their salts, hydrohalides, etc.), phenolic resins, polyoxymethylene (homopolymers and copolymers), polyurethanes, polysulfones, polysulfide rubbers, nitrocelluloses, vinyl butyrates, vinyls (vinyl chloride and/or vinyl acetate containing polymers), ethyl cellulose, the cellulose acetates and butyrates, viscose rayon, shellac, waxes, ethylene copolymers (e.g., ethylene-vinyl acetate copolymers, ethylene-acrylic acid copolymers, ethyleneacrylate copolymers), organic rubbers (both synthetic and natural rubbers) and the like.

The amount of treated filler that can be used in a polymeric composition can vary widely depending upon the polymeric composition and the desired properties of the article to be formed from the polymeric composition. For example, the amount of treated filler present in the polymeric composition can range from 5 up to 70 weight %, based on the total weight of the polymeric composition.

With some non-limiting embodiments, the polymeric composition can include an organic rubber. Non-limiting examples of such rubbers can include but are not limited to natural rubber; those formed from the homopolymerization of butadiene and its homologues and derivatives such as: cis-1,4-polyisoprene; 3,4-polyisoprene; cis-1,4-polybutadiene; trans-1,4-polybutadiene; 1,2-polybutadiene; and those formed from the copolymerization of butadiene and its homologues and derivatives with one or more copolymerizable monomers containing ethylenic unsaturation such as styrene and its derivatives, vinyl-pyridine and its derivatives, acrylonitrile, isobutylene and alkyl-substituted acrylates such as methyl methacrylate. Further non-limiting examples can include styrene-butadiene copolymer rubber composed of various percentages of styrene and butadiene and employing the various isomers of butadiene as desired (hereinafter "SBR"); terpolymers of styrene, isoprene and butadiene polymers, and their various isomers; acrylonitrile-based copolymer and terpolymer rubber compositions; and isobutylene-based rubber compositions; or a mixture thereof, as described in, for example, U.S. Pat. Nos. 4,530,959; 4,616,065; 4,748,199; 4,866,131; 4,894,420; 4,925,894; 5,082,901; and 5,162,409.

Non-limiting examples of suitable organic polymers can include copolymers of ethylene with other high alpha olefins such as propylene, butene-1 and pentene-1 and a diene monomer. The organic polymers can be block, random, or sequential and can be prepared by methods known in the art such as but not limited to emulsion (e.g. e-SBR) or solution polymerization processes (e.g., s-SBR). Further non-limiting examples of polymers for use in the present invention can include those which are partially or fully functionalized including coupled or star-branched polymers. Additional non-limiting examples of functionalized organic rubbers can include polychloroprene, chlorobutyl and bromobutyl rubber as well as brominated isobutylene-co-paramethylstyrene rubber. In a non-limiting embodiment, the organic rubber can be polybutadiene, s-SBR and mixtures thereof.

The polymeric composition can be a curable rubber. The term "curable rubber" is intended to include natural rubber and its various raw and reclaimed forms as well as various synthetic rubbers. In alternate non-limiting embodiments, curable rubber can include combinations of SBR and butadiene rubber (BR), SBR, BR and natural rubber and any other combinations of materials previously disclosed as organic rubbers. In the description of this invention, the terms "rubber", "elastomer" and "rubbery elastomer" can be used interchangeably, unless indicated otherwise. The terms "rubber composition", "compounded rubber" and "rubber compound" are used interchangeably to refer to rubber which has been blended or mixed with various ingredients and materials, and such terms are well-known to those having skill in the rubber mixing or rubber compounding art.

Rubber compositions that include the treated filler produced by the process of the present invention and can be used in the manufacture of a myriad of rubber articles, such as for example, a tire at least one component of which, e.g., the tread, comprises the cured rubber composition, as well as other rubber articles such as shoe soles, hoses, seals, cable jackets, gaskets, belts, and the like. Rubber compositions comprising the treated filler produced by the process of the present invention are particularly advantageous for use in the manufacture of tire treads exhibiting low rolling resistance and high wear resistance, including when the tire treads are based on natural rubber. Moreover, with some embodiments, lower cure temperatures can be achieved for such natural rubber compositions containing the treated filler produced by the process of the present invention.

The treated filler of the present invention (as a powder, granule, pellet, slurry, aqueous suspension, or solvent suspension) may be combined with base material, i.e., material used in the product to be manufactured, to form a mixture referred to as a master batch. In the master batch, the treated filler may be present in higher concentration than in the final product. Aliquots of this mixture are typically added to production-size quantities during mixing operations in order to aid in uniformly dispersing very small amounts of such additives to polymeric compositions, e.g., plastics, rubbers and coating compositions.

The treated filler may be combined with emulsion and/or solution polymers, e.g., organic rubber comprising solution styrene/butadiene (SBR), polybutadiene rubber, or a mixture thereof, to form a master batch. One contemplated embodiment is a master batch comprising a combination of organic rubber, water-immiscible solvent, treated filler and, optionally, processing oil. Such a product may be supplied by a rubber producer to a tire manufacturer. The benefit to the tire manufacturer of using a master batch is that the treated filler is uniformly dispersed in the rubber, which results in minimizing the mixing time to produce the compounded rubber. The master batch can contain from 10 to 150 parts of treated silica per 100 parts of rubber (phr), or from 20 to 130 phr, or from 30 to 100 phr, or from 50 to 80 phr.

The present invention is more particularly described in the following examples, which are intended to be illustrative only, since numerous modifications and variations therein will be apparent to those skilled in the art. Unless otherwise specified, all parts and all percentages are by weight.

Examples

Part 1—Analytical Testing

The silica CTAB surface area values reported in the examples of this application were determined using a CTAB solution and the hereinafter described method. The analysis was performed using a Metrohm 751 Titrino automatic titrator, equipped with a Metrohm Interchangeable "Snap-In" 50 milliliter burette and a Brinkmann Probe Colorimeter Model PC 910 equipped with a 550 nm filter. In addition, a Mettler Toledo HB43 or equivalent was used to determine the 105° C. moisture loss of the silica and a Fisher Scientific Centrific™ Centrifuge Model 225 was used for separating the silica and the residual CTAB solution. The excess CTAB was determined by auto titration with a solution of AEROSOL® OT (dioctylsodium sulfosuccinate, available from Cytec Industries, Inc.) until maximum turbidity was attained, which was detected with the probe colorimeter. The maximum turbidity point was taken as corresponding to a millivolt reading of 150. Knowing the quantity of CTAB adsorbed for a given weight of silica and the space occupied by the CTAB molecule, the external specific surface area of the silica was calculated and reported as square meters per gram on a dry-weight basis.

Solutions required for testing and preparation included a buffer of pH 9.6, cetyl [hexadecyl]trimethyl ammonium bromide (CTAB, also known as hexadecyl trimethyl ammonium bromide, technical grade), AEROSOL® OT and 1N sodium hydroxide. The buffer solution of pH 9.6 was prepared by dissolving 3.101 g of orthoboric acid (99%; technical grade, crystalline) in a one-liter volumetric flask, containing 500 milliliters of deionized water and 3.708 grams of potassium chloride solids (Fisher Scientific, Inc., technical grade, crystalline). Using a burette, 36.85 milliliters of the 1N sodium hydroxide solution was added. The solution was mixed and diluted to volume.

The CTAB solution was prepared using 11.0 g+/−0.005 g of powdered CTAB onto a weighing dish. The CTAB powder was transferred to a 2-liter beaker and the weighing dish was rinsed with deionized water. Approximately 700 milliliters of the pH 9.6 buffer solution and 1000 milliliters of distilled or deionized water was added to the 2-liter beaker and stirred with a magnetic stir bar. A large watch glass was placed on the beaker and the beaker was stirred at room temperature until the CTAB powder was totally dissolved. The solution was transferred to a 2-liter volumetric flask, rinsing the beaker and stir bar with deionized water. The bubbles were allowed to dissipate, and the solution diluted to volume with deionized water. A large stir bar was added and the solution mixed on a magnetic stirrer for approximately 10 hours. The CTAB solution can be used after 24 hours and for only 15 days. The AEROSOL® OT solution was prepared using 3.46 g+/−0.005 g, which was placed onto a weighing dish. The AEROSOL® OT on the weighing dish was rinsed into a 2-liter beaker, which contained about 1500 milliliter deionized water and a large stir bar. The AEROSOL® OT solution was dissolved and rinsed into a 2-liter volumetric flask. The solution was diluted to the 2-liter volume mark in the volumetric flask. The AEROSOL® OT solution was allowed to age for a minimum of 12 days prior to use. The shelf life of the AEROSOL® OT solution is 2 months from the preparation date.

Prior to surface area sample preparation, the pH of the CTAB solution was verified and adjusted to a pH of 9.6+/−

0.1 using 1N sodium hydroxide solution. For test calculations a blank sample was prepared and analyzed. 5 milliliters of the CTAB solution was pipetted and 55 milliliters deionized water was added into a 150-milliliter beaker and analyzed on a Metrohm 751 Titrino automatic titrator. The automatic titrator was programmed for determination of the blank and the samples with the following parameters: Measuring point density=2, Signal drift=20, Equilibrium time=20 seconds, Start volume=0 ml, Stop volume=35 ml, and Fixed endpoint=150 mV. The burette tip and the colorimeter probe were placed just below the surface of the solution, positioned such that the tip and the photo probe path length were completely submerged. Both the tip and photo probe were essentially equidistant from the bottom of the beaker and not touching one another. With minimum stirring (setting of 1 on the Metrohm 728 stirrer) the colorimeter was set to 100% T prior to every blank and sample determination and titration was initiated with the AEROSOL® OT solution. The end point was recorded as the volume (ml) of titrant at 150 mV.

For test sample preparation, approximately 0.30 grams of powdered silica was weighed into a 50-milliliter container containing a stir bar. Granulated silica samples, were riffled (prior to grinding and weighing) to obtain a representative sub-sample. A coffee mill style grinder was used to grind granulated materials. Then 30 milliliters of the pH adjusted CTAB solution was pipetted into the sample container containing the 0.30 grams of powdered silica. The silica and CTAB solution was then mixed on a stirrer for 35 minutes. When mixing was completed, the silica and CTAB solution were centrifuged for 20 minutes to separate the silica and excess CTAB solution. When centrifuging was completed, the CTAB solution was pipetted into a clean container minus the separated solids, referred to as the "centrifugate". For sample analysis, 50 milliliters of deionized water was placed into a 150-milliliter beaker containing a stir bar. Then 10 milliliters of the sample centrifugate was pipetted for analysis into the same beaker. The sample was analyzed using the same technique and programmed procedure as used for the blank solution.

The BET surface area values reported in the examples of this application were determined in accordance with the Brunauer-Emmet-Teller (BET) method in accordance with ASTM D1993-03. The BET surface area was determined by fitting five relative-pressure points from a nitrogen sorption isotherm measurement made with a Micromeritics TriStar 3000™ instrument. A flow Prep060™ station provided heat and a continuous gas flow to prepare samples for analysis. Prior to nitrogen sorption, the silica samples were dried by heating to a temperature of 160° C. in flowing nitrogen (P5 grade) for at least one (1) hour.

The weight percent carbon (C) and sulfur (S) values reported in the examples of this application were determined using a Flash 2000 elemental analyzer. This system was set up to monitor carbon and sulfur. Typical parameters included: the combustion furnace being set to 950° C., the GC oven temperature being set to 65° C., the carrier helium gas flow rate being set to 140 mL/min, the reference helium gas flow rate being set to 100 mL/min, the oxygen flow rate being set to 250 mL/min and oxygen injection time of 5 seconds. For a given run, calibration standards, samples, and controls were typically run. To each 8-10 mg of vanadium pentoxide ($V_2O_5$) was added. The sample size was between 2-4 mg and they were sealed in tin capsules prior to analysis. If the control standard was not within ±10% relative of the known accepted value or the samples run in duplicate do not match (±5% relative), the entire sample run was reanalyzed.

The weight percent mercaptan (SH) values reported in the examples of this application were determined using a back-titration method. The samples were dispersed in 75 mL of 2-Propanol, followed by addition of excess 0.1N Iodine solution. The test solution was then flushed with nitrogen, capped and allowed to stir for 15 minutes. The unreacted iodine was subsequently back-titrated with standardized 0.05N sodium thiosulfate to a colorless end point.

Part 2—Compound Testing Procedures and Equipment

| Test Methods and Equipment Used | | |
|---|---|---|
| Rubber Property | Test Method | Equipment |
| Process | ASTM D1646-00 | Alpha Technologies Mooney MV2000 Viscometer |
| Cure | ASTM D2084-01 | Monsanto MDR2000 |
| Stress/Strain | ASTM D412-98A | Instron 4204/4400R |
| Density (water) | ISO 2787-2008 | Mettler Toledo XS203S with density kit |
| Rebound | ISO 4662 | Zwick 5109 |
| Hardness | ASTM D2240-02, Shore A | Zwick Digital Durometer |
| Dynamic Properties | ASTM D5992-96, parallel plate geometry | Ares-G2 Rheometer |
| Filler Dispersion | ISO 11345, method B, 100× Magnification, Ref. Lib. G (CB/Silica) | Optigrade AB DisperGrader 1000 NT+ |
| Abrasion Resistance | ASTM D-5963-97A | Hampden Model APH-40 DIN Abrasion Tester |

Example A

Precipitated silica slurry was produced through the sulfuric acid neutralization of a sodium silicate. This slurry was filtered and washed to produce a filter cake. This filter cake was mixed with a Cowles blade to form a solid in liquid suspension. The percent solids of this liquefied slurry was determined and used in Equation 1 along with the values shown for the respective treatment materials in Table 1 to determine the amount of treatment applied for the respective examples shown in Table 1.

$$\text{Treatment (g)} = \text{Weight of slurry (g)} * \text{solids (wt. \%/100)} * \text{maleinized polybutadiene (phs/100)} * \text{3-Mercaptopropyltriethoxysilane (phs/100)} \quad \text{Equation 1:}$$

TABLE 1

| | Treatment | |
|---|---|---|
| Example | Amount of maleinized polybutadiene*, phs | Amount of 3-Mercaptopropyltriethoxysilane (>95% Purity), phs |
| CE-A.1 (Comparative) | 0 | 0 |
| A.2 | 5 | 0 |
| A.3 | 5 | 8 |
| A.4 | 10 | 0 |
| A.5 | 10 | 8 |

*Cray Valley's Ricobond® 7004 (~30% actives in aqueous solution)
phs = parts per hundred of solids The respective treatment materials were added and mixed with a Cowles blade for a minimum of 10 minutes. This treated slurry was than dried in a Niro spray drier (inlet temperature about 400° C.; outlet temperature about 105° C.). The moisture of the spray dried powders was in the 4-7 weight percent range. The spray dried powders were granulated using an Alexanderwerk WP 120×40 Roller Compactor using a feed screw speed of 54.5 rpm, a roll compactor speed of 4.6 rpm, a crusher speed of 55.0 rpm, a screen gap of 1.5 mm, a vacuum pressure of 26.2 BAR and at a granulation pressure of 20 BAR. The physical and chemical properties are shown in Table 2. The higher carbon content for the treated silicas of Examples A.2 thru A.5 confirms that the final products contain maleinized polybutadiene and that the amount increases with the amount added. The higher SH and/or S for Examples A.3 and A.5 confirm that these respective final products also contain mercaptopropylsilane.

TABLE 2

Physical and Chemical Properties

| Example | Treatment Description | CTAB, $m^2/g$ | BET, $m^2/g$ | C, wt. % |
|---|---|---|---|---|
| CE-A.1 | None | 178 | 184 | <0.2 |
| A.2 | 5 phs maleinized polybutadiene | 188 | 139 | 3.2 |
| A.3 | 5 phs maleinized polybutadiene + 8 phs 3-Mercaptopropyltriethoxysilane | 169 | 124 | 4.4 |
| A.4 | 10 phs maleinized polybutadiene | 195 | 118 | 6.3 |
| A.5 | 10 phs maleinized polybutadiene + 8 phs 3-Mercaptopropyltriethoxysilane | 166 | 117 | 7.0 |

Model Passenger Tread Formulation I

The model passenger tread formulations used to compare the inventive Example A and comparative silicas is shown in Table 3. A 1.89 liter (L) Kobelco Stewart Bolling Inc. mixer (Model "00") equipped with 4 wing rotors and a Farrel 12 inch two-roll rubber mill were used for mixing the ingredients following ASTM D3182-89.

The formulations were mixed using one non-productive pass, allowing the compound to cool, followed by a mill finish on a two roll mill. For the first pass, the mixer speed was adjusted to 85 rpm and a starting temperature of 150° F. Both the solution styrenebutadiene rubber (SBR), BUNA® VSL 5228-2 (vinyl content: 52%; styrene content: 28%; Treated Distillate Aromatic Extract (TDAE) oil content: 37.5 parts per hundred rubber (phr); Mooney viscosity (ML(1+4)100° C.):50) obtained commercially from LANXESS, and butadiene rubber (BR), BUDENE™ 1207 (cis 1,4 content 98%; Mooney viscosity (ML(1+4)100° C.):55) obtained commercially from The Goodyear Tire & Rubber Company, polymers were added to the mixer. After 30 seconds into the mix cycle half of the test silica was added to the mixer. After another 30 seconds into the mix cycle the other half of the test silica as well as the VIVATEC® 500 TDAE processing oil obtained commercially from the H & R Group Inc. was added to the mixer. After another 30 seconds into the mix cycle, the ram was raised and the chute swept, i.e., the covering on the entry chute was raised and any material that was found in the chute was swept back into the mixer and the ram lowered. After another 30 seconds into the mix cycle the combination of KADOX®-720C surface treated zinc oxide, obtained commercially from Zinc Corporation of America, Rubber grade stearic acid, obtained commercially from R. E. Carroll, Stangard SANTOFLEX® 13 antiozonant, described as N-(1,3-dimethylbutyl)-N'-phenyl-p-phenylenediamine, obtained commercially from Harwick Standard and SUNPROOF® Improved antiozonant hydrocarbon wax obtained commercially from Addivant™ USA, LLC was added to the mixer. After another 30 seconds, the ram was raised and the chute swept. From 150 seconds into the mix cycle forward the mixer speed was adjusted to reach and/or maintain a temperature of 338° F.+/−5° F. for over a 390 second timeframe. The first pass was dropped at a temperature of 338° F.+/−5° F. after approximately 540 seconds of total mix time.

Rubber Makers sulfur ("RM sulfur"), 100% active, obtained commercially from Taber, Inc., the SANTOCURE® CBS, n-cyclohexyl-2-benzothiazolesulfenamide obtained commercially from Harwick Standard, and the diphenylguanidine (DPG), obtained commercially from Harwick Standard Inc., were blended into the cooled first pass Masterbatch on a two-roll rubber mill. Milling was done for approximately 5 minutes performing 5 side cuts and 5 end passes.

TABLE 3

Model Passenger Tread Formulation I

| Additions | | Silica CE-A.1 to A.5 Weight, grams |
|---|---|---|
| PASS 1 Mix Program Step | | |
| POLYMERS | VLS 5228-2 | 450.19 |
| | BR 1207 | 109.16 |
| SILICA ADDITION 1 | Treated Silica | 188.64 |
| SILICA ADDITION 2 | Treated Silica | 188.64 |
| | VIVATEC 500 | 21.83 |
| OTHER | Zinc Oxide (720° C.) | 10.92 |
| | Stearic Acid | 4.37 |
| | SANTOFLEX 13 | 8.73 |
| | SUNPROOF Improved | 6.55 |
| | Subtotal wt: | 989.03 |
| STOCK SHEETED OFF AT APPROXIMATELY .085" STOCK COOLED BEFORE MILL FINISH AFTER A MINIMUM OF ONE HOUR REST | | |
| MILL FINISH | Masterbatch | 989.03 |
| | RM Sulfur | 8.73 |
| | SANTOCURE CBS | 13.10 |
| | DPG | 2.18 |
| | 18 END PASSES | |
| | Total wt: | 1013.05 |

Stress/Strain test specimens were cured for 30" at 150° C. while all other test specimens were cured for 40" at 150° C. Specimen preparation and testing were performed using the procedures and equipment shown in part 2. The compound performance properties are shown in Table 4.

TABLE 4

Model Passenger Tread Formulation Results

| | Example | | | | |
|---|---|---|---|---|---|
| | CE-A.1A | A.2A | A.3A | A.4A | A.5A |
| Silica component | CE-A.1 | A.2 | A.3 | A.4 | A.5 |
| Mooney Viscosity, ML (1 + 4) | 136 | 130 | 153 | 91 | 93 |
| Stress Strain | | | | | |
| 300/100% Modulus ratio | 3.7 | 3.0 | 4.5 | 3.4 | 3.9 |
| Toughness (Tensile * Elongation), MPa * % | 8112 | 10483 | 5200 | 10349 | 8328 |
| DIN Abrasion Loss, $mm^3$ | 185 | 165 | 161 | 158 | 147 |

TABLE 4-continued

Model Passenger Tread Formulation Results

| | Example | | | | |
|---|---|---|---|---|---|
| | CE-A.1A | A.2A | A.3A | A.4A | A.5A |
| ARES - Temperature Sweep, 1 Hz, 2% strain | | | | | |
| Tan (δ) | | | | | |
| @ 60° C. | 0.113 | 0.137 | 0.131 | 0.192 | 0.132 |
| @ 0° C. | 0.273 | 0.305 | 0.406 | 0.393 | 0.393 |
| Delta: 0° C.- 60° C. | 0.159 | 0.167 | 0.275 | 0.201 | 0.261 |
| ARES - Strain Sweep, 30° C, 1 Hz | | | | | |
| Δ G', 0.5%-16% | 7.5 | 8.4 | 2.9 | 5.1 | 3.0 |

A comparison of the treated silicas containing only the maleinized polybutadiene treatment (examples A.2A and A.4A) to the non-treated silica produced from the same base slurry (example CE-A.1) indicates that this treatment results in a desirable reduction in Mooney viscosity, a desirable increase in toughness and a desirable decrease in DIN abrasion loss. The former is predictive of an improvement in processability while the latter two would predict an improvement in reinforcement leading to such things as improved treadwear. A comparison of the treated silicas containing both the maleinized polybutadiene and mercaptopropylsilane treatment (examples A.3A and A.5A) to the inventive silicas containing only the maleinized polybutadiene treatment (examples A.2A and A.4A) as well as the non-treated silica produced from the same base slurry (example CE-A.1A) indicates that in addition to the above benefits this combination of treatment also provides a desirable increase in 300/100% Modulus ratio, a desirable increase in delta Tan (δ) (0° C.-60° C.), and a desirable decrease in ΔG', 0.5%-16%. The first would predict a further enhancement in reinforcement leading to such things as improved treadwear while the latter two would predict an improved balance in traction and rolling resistance (i.e. the ability to obtain higher traction with lower rolling resistance which would provide improvements in safety and fuel efficiency).

Example B

Another precipitated silica slurry was produced through the sulfuric acid neutralization of a sodium silicate. For this product, the slurry was filtered and washed to produce a filter cake. This filter cake was mixed with a Cowles blade to form a solid in liquid suspension. The percent solids of this liquefied slurry was determined and used in Equation 2 along with the values shown for the respective treatment materials in Table 5 to determine the amount of treatment applied for the respective examples shown in Table 5.

Treatment (g)=Weight of slurry (g)*
 solids (wt. %/100)*
 Styrene Maleic Anhydride
 Copolymer (phs/100). Equation 2:

TABLE 5

| | Treatment |
|---|---|
| Example | Amount of Styrene Maleic Anhydride Copolymer*, phs |
| CE-B.1 (Comparative) | None |
| B.2 | 15 |
| B.3 | 30 |

*Cray Valley's SMA ® 1000 H Solution (ammonia salt, ~36% Active Solids, $M_n$ = 2000, $M_w$ = 5500)
phs = per hundred of solids The respective treatment materials were added and mixed with a Cowles blade for a minimum of 10 minutes. This treated slurry was than dried in a Niro spray drier (inlet temperature about 400° C.; outlet temperature about 105° C.). The moisture of the spray dried powders was in the 4-7 weight percent range. The spray dried powders were granulated using an Alexanderwerk WP 120×40 Roller Compactor using a feed screw speed of 54.5 rpm, a roll compactor speed of 4.6 rpm, a crusher speed of 55.0 rpm, a screen gap of 1.5 mm, a vacuum pressure of 26.2 BAR and at a granulation pressure of 20 BAR. The physical and chemical properties are shown in Table 6. The higher carbon content for the treated silicas B.2 and B.3 confirms that the final products contain Styrene Maleic Anhydride Copolymer and that the amount retained increases with the amount added.

TABLE 6

Physical and Chemical Properties

| Example | Treatment Description | CTAB, m²/g | BET, m²/g | Carbon, wt. % |
|---|---|---|---|---|
| CE-B.1 | None (Comparative) | 163 | 159 | <0.2 |
| B.2 | 15 phs Styrene Maleic Anhydride Copolymer (SMA 1000) | 160 | 125 | 3.1 |
| B.3 | 30 phs Styrene Maleic Anhydride Copolymer (SMA 1000) | 172 | 119 | 4.5 |

Model Passenger Tread Formulation II

The model passenger tread formulations used to compare the example B inventive and comparative silicas are shown in Table 7. A Brabender Electronic Plasti-Corder® Prep Mixer equipped with a 350/420 ml volume mixing head containing Banbury blades as well as an oil heated with heat exchanger and a Farrel 12 inch two-roll rubber mill were used for mixing the ingredients following ASTM D3182-89.

The formulations were mixed using two non-productive passes and sheeted off between each pass to 0.085 inches (2.16 mm). The material was allowed to cool for at least one hour between passes and followed by a mill finish on a two roll mill.

For the first pass, the mixer speed was adjusted to 70 rpm, the mixer temperature adjusted to 85° F. and both the solution SBR, BUNA VSL 5228-2, and BR, BUDENE 1207 polymers were added to the mixer. After 30 seconds into the mix cycle approximately half of the test silica and the Si 69 was added to the mixer. After another 30 seconds into the mix cycle, the remaining approximately one half of the test silica and the SUNDEX 8125 was added to the mixer. After another 30 seconds into the mix cycle, the ram was raised and the chute swept, i.e., the covering on the entry chute was raised and any material that was found in the chute was swept back into the mixer and the ram lowered. From 120 seconds into the mix cycle forward the mixer speed was adjusted to reach and/or maintain a temperature of 320° F.+/−5° F. for over a 180 second timeframe. The first pass was dropped at a temperature of 320° F.+/−5° F. after approximately 300 seconds of total mix time.

For the second pass the mixer speed was adjusted to 70 rpm, the mixer temperature was adjusted to 85° F. and the cooled 1$^{st}$ pass Masterbatch and the KADOX-720C surface treated zinc oxide were added to the mixer. After 30 seconds into this second mix cycle the combination of Rubber grade stearic acid, Stangard SANTOFLEX 13 and SUNPROOF Improved were added to the mixer. After another 30 seconds into this second mix cycle the ram was raised and the chute swept. From 90 seconds into this second mix cycle forward the mixer speed was adjusted to reach and/or maintain a temperature of 320° F.+/−5° F. for over a 570 second timeframe. This second pass was dropped at a temperature of 320° F.+/−5° F. after approximately 660 seconds of total mix time.

The RM sulfur, SANTOCURE CBS, and the DPG were blended into the cooled first pass Masterbatch on a two-roll rubber mill. Milling was done for approximately 5 minutes performing 5 side cuts and 5 end passes.

TABLE 7

Model Passenger Tread Formulation II

| Example | | | | | |
|---|---|---|---|---|---|
| CE-B.1A | B.2A | B.3A | B.3B | B.2B | B.3C |
| | | Silica component | | | |
| CE-B.1 | B.2 | B.3 | B.3 | B.2 | B.3 |
| | | Weight (Grams) | | | |

Pass 1

| | | | | | |
|---|---|---|---|---|---|
| VSL 5228-2 | 123.83 | 123.51 | 123.51 | 123.29 | 120.19 | 120.19 |
| BR 1207 | 30.03 | 29.95 | 29.95 | 29.90 | 29.15 | 29.15 |
| Silica | 48.04 | 52.11 | 52.11 | 52.02 | 50.71 | 50.71 |
| Si-69 | 7.69 | | | | 7.46 | 7.46 |
| Silica | 48.04 | 52.11 | 52.11 | 52.02 | 50.71 | 50.71 |
| Sundex 8125 TN | 6.01 | 5.99 | 5.99 | 5.98 | 5.83 | 5.83 |
| Total Grams: | 263.63 | 263.67 | 263.67 | 263.21 | 264.05 | 264.05 |

TABLE 7-continued

Model Passenger Tread Formulation II

| Example | | | | | |
|---|---|---|---|---|---|
| CE-B.1A | B.2A | B.3A | B.3B | B.2B | B.3C |
| | | Silica component | | | |
| CE-B.1 | B.2 | B.3 | B.3 | B.2 | B.3 |
| | | Weight (Grams) | | | |

Pass 2

| | | | | | | |
|---|---|---|---|---|---|---|
| Master Batch | 263.63 | 263.67 | 263.67 | 263.21 | 264.05 | 264.05 |
| Zinc Oxide (KADOX 720C) | 3.00 | 2.99 | 2.99 | 2.99 | 2.91 | 2.91 |
| Stearic Acid | 1.20 | 1.20 | 1.20 | 1.20 | 1.17 | 1.17 |
| SANTOFLEX 13 | 2.40 | 2.40 | 2.40 | 2.39 | 2.33 | 2.33 |
| SUNPROOF Improved | 1.80 | 1.80 | 1.80 | 1.79 | 1.75 | 1.75 |
| Subtotal Grams: | 8.41 | 8.39 | 8.39 | 8.37 | 8.16 | 8.16 |
| Total Grams: Mill Finish | 272.03 | 272.05 | 272.05 | 271.58 | 272.21 | 272.21 |
| Master Batch | 272.03 | 272.05 | 272.05 | 271.58 | 272.21 | 272.21 |
| RM Sulfur | 1.68 | 1.68 | 1.68 | 2.39 | 1.63 | 1.63 |
| CBS | 2.04 | 2.04 | 2.04 | 3.59 | 1.98 | 1.98 |
| DPG | 2.40 | 2.40 | 2.40 | 0.60 | 2.33 | 2.33 |
| Subtotal Grams: | 6.13 | 6.11 | 6.11 | 6.58 | 5.95 | 5.95 |
| Total Grams: | 278.16 | 278.16 | 278.16 | 278.16 | 278.16 | 278.16 |

Stress/Strain test specimens were cured for 30" at 150° C. while all other test specimens were cured for 40" at 150° C. Specimen preparation and testing were performed using the procedures and equipment shown in part 2. The compound performance properties are shown in Table 8. A comparison of the treated silicas containing only the Styrene Maleic Anhydride Copolymer treatment (examples B.2A and B.3A) without in-situ coupling agent to the non-treated silica produced from the same base slurry (example CE-B.1A) combined with an in-situ coupling agent (indicative of the current art) (Examples B.2A and B.3A versus CE-B.1A respectively) indicates that this treatment results in a desirable increase in Scorch Time (TS2), a desirable decrease in Cure Time (TC90), a desirable increase in Tensile and Toughness, a desirable decrease in both G'@-30° C. and G'(−30° C.)/G'(60° C.), and a desirable increase in G'@ 1.0%. These would predict an improvement in workability, productivity, reinforcement, improved ice traction with acceptable wet traction and stiffness (related to improved handling). The data indicates that optimized treatment levels are required to get the best balance of properties. A comparison of Example B.3B with CE-B.1A, B.2A and B.3A demonstrate that compound formulation optimization (i.e. cure package adjustments in sulfur, CBS and DPG) can provide a further balancing of properties. A comparison of Examples B.2B and B.3C compared to CE-B.1A, B.2A and B.3A indicate that the silicas treated with Styrene Maleic Anhydride Copolymer combined with an in-situ coupling agent (indicative of the current art) still provides the desirable benefits discussed above.

TABLE 8

Model Passenger Tread Formulation Results

| | Example | | | | | |
|---|---|---|---|---|---|---|
| | CE-B.1A | B.2A | B.3A | B.3B | B.2B | B.3C |
| Silica, phr | 80.0 | 87.0 | 87.0 | 87.0 | 87.0 | 87.0 |
| Si-69, phr | 6.4 | | | | 6.4 | 6.4 |
| RM Sulfur, phr | 1.40 | 1.40 | 1.40 | 2.00 | 1.40 | 1.40 |
| CBS, phr | 1.70 | 1.70 | 1.70 | 3.00 | 1.70 | 1.70 |
| DPG, phr | 2.00 | 2.00 | 2.00 | 0.50 | 2.00 | 2.00 |
| Scorch Time (TS2), minutes | 2.7 | 4.9 | 1.0 | 0.5 | 5.6 | 6.1 |
| Cure Time (TC90), minutes | 35.2 | 31.0 | 28.9 | 32.9 | 36.8 | 31.3 |
| Stress Strain | | | | | | |
| Tensile, MPa | 13.8 | 16.5 | 12.8 | 15.3 | 16.7 | 14.2 |
| Toughness (Tensile * Elongation), MPa * % | 4194 | 9965 | 8214 | 8327 | 6285 | 5270 |
| RDS - temp sweep, 1 Hz, 2% strain | | | | | | |
| G'@−30° C., MPa | 38.0 | 44.7 | 5.8 | 58.2 | 35.0 | 39.4 |
| G'(−30° C.)/G'(60° C.) | 19.2 | 18.2 | 2.4 | 22.3 | 17.3 | 17.1 |
| RDS - strain sweep, 30 C., 1 Hz | | | | | | |
| G'@ 1.0%, MPa | 2.742 | 3.436 | 4.144 | 3.953 | 2.544 | 3.240 |

SMA = Styrene Maleic Anhydride Copolymer (SMA ® 1000)

Example C

Another precipitated silica slurry was produced through the sulfuric acid neutralization of a sodium silicate. For this product, the slurry was filtered and washed to produce a filter cake. This filter cake was mixed with a Cowles blade to form a solid in liquid suspension. The percent solids of this liquefied slurry was determined and used in Equation 2 above along with the values shown for the respective treatment materials in Table 9 to determine the amount of treatment applied for the respective examples shown in Table 9. The respective treatment materials were added and mixed with a Cowles blade for a minimum of 10 minutes. This treated slurry was than dried in a Niro spray drier (inlet temperature about 400° C.; outlet temperature about 105° C.). The moisture of the spray dried powders was in the 4-7 weight percent range. The spray dried powders were granulated using an Alexanderwerk WP 120×40 Roller Compactor using a feed screw speed of 54.5 rpm, a roll compactor speed of 4.6 rpm, a crusher speed of 55.0 rpm, a screen gap of 1.5 mm, a vacuum pressure of 26.2 BAR and at a granulation pressure of 20 BAR. The physical and chemical properties are shown in Table 10. The higher carbon content for the inventive silicas C.2 and C.3 confirms that the final products contain Styrene Maleic Anhydride Copolymer and that the amount retained increases with the amount added.

TABLE 9

Treatment

| Example | Amount of Styrene Maleic Anhydride Copolymer*, phs |
|---|---|
| CE-C.1 (Comparative) | None |
| C.2 | 15 |
| C.3 | 30 |

*Cray Valley's SMA ® 3000 H Solution (ammonia salt, ~15% Active Solids, $M_n$ = 3800, $M_w$ = 9500)
phs = parts per hundred of solids

TABLE 10

Physical and Chemical Properties

| Example | Treatment Description | CTAB, $m^2/g$ | BET, $m^2/g$ | Carbon, wt. % |
|---|---|---|---|---|
| CE-C.1 | None (Comparative) | 178 | 188 | <0.2 |
| C.2 | 15 phs Styrene Maleic Anhydride Copolymer (SMA 3000) | 179 | 164 | 3.1 |
| C.3 | 30 phs Styrene Maleic Anhydride Copolymer (SMA 3000) | 183 | 151 | 5.2 |

Model Passenger Tread Formulation II

The model passenger tread formulations used to compare the example C inventive and comparative silicas are shown in Table 11. The mixing, curing, specimen preparation and testing procedures were the same as described in example B. The compound performance properties are shown in Table 12. A comparison of the inventive silicas containing only the Styrene Maleic Anhydride Copolymer treatment (examples C.2 and C.3) without in-situ coupling agent to the non-treated silica produced from the same base slurry (example CE-C.1) combined with an in-situ coupling agent (indicative of the current art) (compounds 11.2 and 11.3 versus 11.1 respectively) indicates that this treatment results in a desirable increase in Scorch Time (TS2), while maintaining an acceptable Cure Time (TC90), a desirable increase in Tensile and Toughness, a desirable decrease in G'(−30° C.)/G'(60° C.), and a desirable increase in G'@ 1.0%. These would predict an improvement in workability, productivity, reinforcement, ice traction/wet traction balance and stiffness (related to improved handling). The data indicates that optimized treatment levels are required to get the best balance of properties. A comparison of examples C.3B with CE-C.1A, C.2A and C.3A indicate that compound formulation optimization (i.e. cure package adjustments in sulfur, CBS and DPG) can provide a further balancing of properties. A comparison of Examples C.2B and C.3C to CE-C.1A, C.2A and C.3A indicate that the treated silicas containing only the Styrene Maleic Anhydride Copolymer treatment combined with an in-situ coupling agent (indicative of the current art) still provides the desirable benefits discussed above.

TABLE 11

Model Passenger Tread Formulation II

| | \multicolumn{6}{c}{Example} | | | | | |
|---|---|---|---|---|---|---|
| | CE-C.1A | C.2A | C.3A | C.3B | C.2B | C.3C |
| | \multicolumn{6}{c}{Silica component} | | | | | |
| | CE-C.1 | C.2 | C.3 | C.3 | C.2 | C.3 |
| | \multicolumn{6}{c}{Weight (Grams)} | | | | | |
| Pass 1 | | | | | | |
| VSL 5228-2 | 123.83 | 123.51 | 123.51 | 123.29 | 120.19 | 120.19 |
| BR 1207 | 30.03 | 29.95 | 29.95 | 29.90 | 29.15 | 29.15 |
| Silica | 48.04 | 52.11 | 52.11 | 52.02 | 50.71 | 50.71 |
| Si-69 | 7.69 | | | | 7.46 | 7.46 |
| Silica | 48.04 | 52.11 | 52.11 | 52.02 | 50.71 | 50.71 |
| Sundex 8125 TN | 6.01 | 5.99 | 5.99 | 5.98 | 5.83 | 5.83 |
| Total Grams: | 263.63 | 263.67 | 263.67 | 263.21 | 264.05 | 264.05 |
| Pass 2 | | | | | | |
| Master Batch | 263.63 | 263.67 | 263.67 | 263.21 | 264.05 | 264.05 |
| Zinc Oxide (720 C.) | 3.00 | 2.99 | 2.99 | 2.99 | 2.91 | 2.91 |
| Stearic Acid | 1.20 | 1.20 | 1.20 | 1.20 | 1.17 | 1.17 |
| Santoflex 13 | 2.40 | 2.40 | 2.40 | 2.39 | 2.33 | 2.33 |
| Sunproof Improved | 1.80 | 1.80 | 1.80 | 1.79 | 1.75 | 1.75 |
| Subtotal Grams: | 8.41 | 8.39 | 8.39 | 8.37 | 8.16 | 8.16 |
| Total Grams: | 272.03 | 272.05 | 272.05 | 271.58 | 272.21 | 272.21 |
| Mill Finish | | | | | | |
| Master Batch | 272.03 | 272.05 | 272.05 | 271.58 | 272.21 | 272.21 |
| RM Sulfur | 1.68 | 1.68 | 1.68 | 2.39 | 1.63 | 1.63 |
| CBS | 2.04 | 2.04 | 2.04 | 3.59 | 1.98 | 1.98 |
| DPG | 2.40 | 2.40 | 2.40 | 0.60 | 2.33 | 2.33 |
| Subtotal Grams: | 6.13 | 6.11 | 6.11 | 6.58 | 5.95 | 5.95 |
| Total Grams: | 278.16 | 278.16 | 278.16 | 278.16 | 278.16 | 278.16 |

TABLE 12

Model Passenger Tread Formulation Results

| | \multicolumn{6}{c}{Example} | | | | | |
|---|---|---|---|---|---|---|
| | CE-C.1A | C.2A | C.3A | C.3B | C.2B | C.3C |
| Silica, phr | 80.0 | 87.0 | 87.0 | 87.0 | 87.0 | 87.0 |
| Si-69, phr | 6.4 | | | | 6.4 | 6.4 |
| RM Sulfur, phr | 1.40 | 1.40 | 1.40 | 2.00 | 1.40 | 1.40 |
| CBS, phr | 1.70 | 1.70 | 1.70 | 3.00 | 1.70 | 1.70 |
| DPG, phr | 2.00 | 2.00 | 2.00 | 0.50 | 2.00 | 2.00 |
| Scorch Time (TS2), minutes | 2.9 | 4.2 | 5.3 | 0.6 | 3.1 | 3.9 |
| Cure Time (TC90), minutes | 34.5 | 41.5 | 35.6 | 33.2 | 31.7 | 33.8 |
| Tensile, MPa | 15.3 | 16.2 | 15.7 | 15.4 | 14.3 | 16.6 |
| Toughness (Tensile * Elongation), MPa * % | 5610 | 10858 | 11730 | 9734 | 4746 | 6946 |
| \multicolumn{7}{c}{RDS - temp sweep, 1 Hz, 2% strain} | | | | | | |
| G'@−30° C., Mpa | 49.350 | 86.919 | 78.691 | 94.384 | 60.912 | 72.326 |
| G'(30° C.)/G'(60° C.) | 24.023 | 18.311 | 21.294 | 22.293 | 22.147 | 18.560 |
| \multicolumn{7}{c}{RDS - strain sweep, 30 C., 1 Hz} | | | | | | |
| G' @ 1.0%, MPa | 2.760 | 9.449 | 7.359 | 7.152 | 3.726 | 6.353 |

SMA = Styrene Maleic Anhydride Copolymer (SMA ® 3000)

Example D

Water (75.0 liters) was added to the 150 L reactor tank and heated to 72.0° C. via indirect steam coil heat. Sodium silicate (2.5 L) was added at a rate of 560 mL/min. The temperature was adjusted as necessary to 72.0° C. via indirect steam coil heating and the precipitation step was initiated. The 150 liter reactor was agitated via the main tank agitator. The main agitator was left on and a simultaneous addition precipitation step was started. Sodium silicate (50.4 liters) and 3.2 liters of sulfuric acid were added simultaneously over a period of 90 minutes. The sodium silicate was added via an open tube near the bottom of the tank at a rate of 560 ml/min and the sulfuric acid was added directly above the secondary high speed mixer blades. The acid addition rate averaged 36.0 ml/min over the course of the 90 minute simultaneous addition step.

At the end of the simultaneous addition step, a 100 minute age step was initiated and the temperature was raised to 85° C. The pH of the solution was adjusted to 8.5 using sulfuric acid. SILQUEST® A-1891 (3-mercaptopropyltriethoxysilane, available commercially from Momentive) was added into the reactor at 5.5 PHS (744.3 grams). Then polyethyleneoxide silane (PEO silane; SILQUEST A-1230) was added at 6 PHS to the reactor. The reaction mixture completed ageing under stirring for the remainder of the 100 minutes. The temperature was maintained at 85° C. After the age step was completed, sulfuric acid was added to reach a final batch pH of 4.8.

The mixture was pumped into a filter press and washed until the conductivity of the rinse water measured less than 1000 microsiemens. The resulting filter cake was reslurried with water to form a pumpable slurry and spray dried using a Niro spray drier (Utility Model 5 with Type FU-1 rotary atomizer, Niro Inc.). The spray dried powder was granulated using an Alexanderwerk WP120X40 Roller Compactor with the following conditions; screw speed=55 rpm, roller speed 4.5 rpm, crusher speed=55 rpm, hydraulic pressure=25 bar and screen size ~7 mesh. The physical properties of the synthesized silicas are summarized in Table 13.

TABLE 13

Physical and Chemical Properties

| Example | Treatment Description | CTAB, m²/g | BET, m²/g | Carbon, wt. % |
|---|---|---|---|---|
| CE-D.1 | None (Comparative) | 160 | 160 | <0.2 |
| D.2 | PEO treated silica and 5.5 PHS silane | 133 | 157 | 2.4 |

The model passenger tread formulations used to compare the example D inventive and comparative silicas are shown in Table 14. The higher carbon content for the inventive silica indicates that the PEO silane has in fact been retained on the silica surface.

TABLE 14

Model Passenger Tread Formulation Results
MODEL PASSENGER FORMULATION III

| | Example | |
|---|---|---|
| | CE-D.1A | D.2A |
| Silica component | CE-D.1 | D.2 |
| Silica, phr | 80.0 | 80.0 |
| Si-69, phr | 7.0 | 0.0 |
| RM Sulfur, phr | 1.4 | 2.0 |
| CBS, phr | 1.7 | 3.0 |
| DPG, phr | 2.0 | 0.5 |
| Scorch Time (TS2), minutes | 3.2 | 4.9 |
| Cure Time (TC90), minutes | 19.2 | 28.2 |
| $M_H$-$M_L$ | 21.1 | 13.8 |
| Tensile, MPa | 17.7 | 12.5 |
| Elongation | 328.0 | 249.0 |
| Hardness, Shore A | 58.0 | 60.0 |
| Toughness (Tensile * Elongation), MPa * % | 5806 | 3113 |
| RDS - temp sweep, 1 Hz, 2% strain | | |
| Tan delta 60° C. | 0.066 | 0.067 |
| Tan delta 0° C. | 0.366 | 0.466 |
| Delta tan delta 0° C. – 60° C. | 0.301 | 0.399 |
| RDS - strain sweep 30 C., 1 Hz | | |
| G'@ 0.5%, MPa | 2.1 | 2.2 |

A comparison between the comparative silica formulation CE-D.1A and the silica formulation D.2A shows a reduction in elongation and an increase in hardness.

Alternatively, the PEO treated silica was tested in a natural rubber based truck tire tread compound. PEO type materials are commonly used as both an activator and a processing aid in rubber compounding.

The following ingredients listed in Table 15 in amounts of parts per hundred parts of rubber by weight (phr) were added in the order described to a polyethylene bag held erect in a 500-milliliter (mL) plastic cup.

TABLE 15

Ingredients combined into plastic bag for natural rubber mix

| Material | Amount (phr) |
|---|---|
| Processing oil* | 5.0 |
| Zinc oxide | 4.0 |
| SANTOFLEX 13 (6-PPD) | 2.5 |
| Stearic acid | 2.0 |
| STANGARD ® TMQ** | 2.0 |
| SUNPROOF Improved | 1.0 |

*VIVATECH ® 500 aromatic hydrocarbon processing oil, distributed by Hansen-Rosenthal KG
**Stangard TMQ distributed by Harwick Standard The remaining ingredients, shown in Table 16, were weighed and added to a paper cup.

TABLE 16

Ingredients combined into paper cup for natural rubber mix

| Material | Amount (phr) |
|---|---|
| Test Silica Filler | 50.0 |
| Carbon Black N-220* | 3.0 |
| Silane (if not pre-reacted) | 6.0 |

*Sid Richardson Carbon and Energy Company

A 1.89 liter (L) Kobelco internal mixer (Model "BR00") was used for mixing the various ingredients. Immediately prior to adding the batch ingredients to the mixer, 800 grams (g) of CV-60 grade natural rubber was put through the mixer to clean it of any residue of previous runs and increase the temperature to about 93° C. (200° F.). After removing the rubber, the mixer was cooled to about 65° C. (150° F.) before adding the ingredients to produce the rubber test sample. A rubber composition is prepared using the test filler, the following other enumerated ingredients in Table 17 and the following procedure.

TABLE 17

Model NR Truck Tread Compound

| Ingredient | CE-D.1B Amount (PHR) | D.2B |
|---|---|---|
| Pass 1 | | |
| Clarimer L CV60 | 100.0 | 100.0 |
| Carbon Black N-220 | 3.0 | 3.0 |
| Silica Addition 1 | 25.0 | 25.0 |
| Silane (Si-266) | 6.0 | 0.0 |
| Silica Addition 2 | 25.0 | 25.0 |
| Vivatech 500 | 5.0 | 5.0 |
| TOTAL | 164.0 | 158.0 |
| Pass 2 | | |
| Masterbatch | 164.0 | 100.0 |
| Zinc Oxide | 4.0 | 3.0 |
| Stearic Acid | 2.0 | 25.0 |
| Santoflex 13 (6-PPD) | 2.5 | 25.0 |
| Stangard TMQ | 2.0 | 5.0 |
| Sunproof Improved | 1.0 | 158.0 |
| TOTAL | 175.5 | 169.5 |

STOCK SHEETED OFF AT APPROXIMATELY .085"
STOCK COOLED BEFORE MILL FINISH AFTER A MINIMUM OF ONE HOUR REST
MILL FINISH

| Masterbatch | 175.5 | 169.5 |
|---|---|---|
| RM Sulfur | 2.0 | 2.0 |
| CBS | 3.0 | 3.0 |
| DPG | 0.5 | 0.5 |
| TOTAL | 181.0 | 175.0 |

The first pass was initiated by adding the rubber, to the mixer and mixing at 30 rpm. The rotor speed was maintained at 30 rpm and 3.0 phr carbon black was added. After one minute, half of the test filler and all of the silane Si-266 (Bis[3-(triethoxysilyl) propyl]disulfide, available commercially from Evonik) was added with the remainder of the test filler being added one minute later. The Sundex 8125 was added with the second part of test filler. At three minutes, the ram was raised and the chute swept, i.e., the covering on the entry chute was raised and any material that was found in the chute was swept back into the mixer. The speed of the mixer was increased to 70 rpm. The contents in the mixer were mixed for an additional two minutes to achieve a maximum temperature in the range of from 145 to 150° C. (293 to 302° F.) and to complete the first pass in the mixer. Depending upon the type of sample, the rotor speed of the mixer may be increased or decreased after 4 minutes to achieve a temperature in the foregoing range within the specified mixing period. The material was removed from the mixer.

After completing the first pass, the removed material was weighed and sheeted in a Farrel 12 inch, two-roll rubber mill at 2.032 mm±0.127 mm (0.080 inch±0.005 inch). The resulting milled stock was used for the second pass in the mixer. The second pass was initiated by adding the first pass stock to the mixer operating at 60 rpm. After one minute, the pre-weighed zinc oxide, stearic acid, Santoflex 13, Stangard TMQ and Sunproof Improved were added to the mixer. After an additional minute, the ram was raised and the chute swept. The mixing speed was decreased to 30 rpm. The second pass was completed by mixing the stock an additional 3.0 minutes while maintaining the temperature at or below 135° C. (257° F.) to 140° C. (284° F.).

A Farrel 12 inch, two-roll rubber mill was heated to approximately 60° C. (140° F.). The stock from the second pass of Part B was fed into the running mill with a nip setting of 2.032 mm±0.127 mm (0.080 inch±0.005 inch). The RM sulfur, CBS and DPG were added to the mill and blended together. The total mill time was about five minutes with 5 side cuts and 5 end rolls. The resulting sheet was placed on a flat surface until the temperature of the sheet reached room temperature. Typically, the sheet cooled within about 30 minutes. The sheet stock collected off the mill was placed on a flat clean surface. Using a stencil, a rectangular sample 203.2 mm×152.4 mm (8 inches×6 inches) was cut from the sheet stock. The sample was conditioned, i.e., stored between clean polyethylene sheets and maintained for 15 to 18 hours at a temperature of 23°±2° C., and a relative humidity of 50%±5%.

After conditioning, the sample was placed in a 203.2 mm×152.4 mm× 2.286 mm (8 inches×6 inches× 0.09 inch) standard frame machine steel compression mold having a polished surface. The sample was cured in a 61 centimeter× 61 centimeter (24 inches×24 inches) 890 kilonewton (100 ton) 4-post electrically heated compression press, for T90, i.e., the time it takes for 90 percent of the cure to occur, in accordance with ASTM D-2084, plus 5 minutes at 150° C. (302° F.) under a pressure of 13.79 megapascals (2000 pounds per square inch). Typically, curing was completed within about 10 minutes. The resulting cured rubber sheet was removed from the mold and maintained for 15 to 18 hours at a temperature of 23°±2° C. (73.4±3.6° F.), and a relative humidity of 50%±5% prior to testing in Part D.

Testing was performed in accordance with ASTM D 412-98a—Test Method A. Dumbbell test specimens were prepared using Die C. An Instron model 4204 with an automated contact extensiometer for measuring elongation was used. The cross-head speed was found to equal 508 mm/min. All calculations were done using the Series IX Automated Materials Testing software supplied by the manufacturer. The Reinforcement Index equals the Tensile Stress at 300% elongation (in MPa) divided by the Tensile Stress at 100% elongation (in MPa). When the samples were prepared using the Standard Compounding Protocol, the results were reported as the Standard Reinforcement Index. The compounding results are shown in Table 18.

TABLE 18

Model NR Truck Tread Results
MODEL TRUCK TREAD I

| | Example | |
|---|---|---|
| | CE-D.1B | D.2B |
| Silica component | CE-D.1 | D.2 |
| Silica, phr | 50.0 | 50.0 |
| RM Sulfur, phr | 2.0 | 2.0 |
| CBS, phr | 3.0 | 3.0 |
| DPG, phr | 0.5 | 0.5 |
| Scorch Time (TS2), minutes | 3.1 | 1.8 |
| Cure Time (TC90), minutes | 5.7 | 3.9 |
| $M_L(1+4)$, MU | 75.1 | 69.8 |
| $M_H\text{-}M_L$ | 29.0 | 31.0 |
| Tensile, MPa | 32.8 | 31.4 |
| Elongation | 580.0 | 552.0 |
| Hardness, Shore A | 57.0 | 60.0 |
| Toughness (Tensile * Elongation), MPa * % | 19024.0 | 17333.0 |
| RDS - temp sweep, 1 Hz, 2% strain | | |
| Tan delta 60° C. | 0.036 | 0.059 |
| Tan delta 0° C. | 0.083 | 0.101 |
| Delta tan delta 0° C. – 60° C. | 0.047 | 0.043 |
| RDS - strain sweep, 30 C., 1 Hz | | |
| G'@ 0.5%, MPa | 2.7 | 2.8 |

*comparative example is based on a silica produced following the exact recipe of example D.2 except that stearic acid was used at 6 PHR instead of the PEO silane.

In natural rubber, the inventive silica D.2B shows a characteristic reduction in cure time that is typical for the use of glycol based processing aids. The presence of the polymeric material on the silica surface shows a reduction in Mooney viscosity relative to the comparative example. The crosslink density and the resulting hardness of the resulting inventive silica compound are also increased despite identical curing conditions.

Example E

A hyperbranched acrylic polymer according to the present invention was prepared from the following mixture of ingredients as described in Table 19:

TABLE 19

Acrylic Polymer Preparation

| Ingredients | Parts by Weight (grams) |
|---|---|
| Charge I | |
| butyl acrylate | 2237.2 |
| butyl methacrylate | 1029.3 |
| hydroxyethyl acrylate | 470.1 |
| α-methylstyrene | 470.1 |
| acrylic acid | 329.1 |
| Allyl methacrylate | 164.60 |
| di-t-amyl peroxide | 235.20 |
| ethylene glycol monobutyl ether | 940.30 |
| Charge II | |
| di-t-amyl peroxide | 150.0 |

A 300 cm³ electrically heated continuous stirred tank reactor with an internal cooling coil was filled with ethylene glycol monobutyl ether and the temperature was adjusted to 200° C. Charge I from Table 19 was fed to the reactor from a feed tank at 100 cm³/minute, resulting in a residence time of three minutes. The reactor was kept volumetrically full at a pressure of 400-600 psi. The temperature was held constant at 200° C. The reactor output was drained to a waste vessel for the first nine minutes and was then diverted to a 3000 cm³ continuous stirred tank reactor fitted with a pressure relief valve set to vent at 35 psi. At this point, Charge II was fed to the second reactor at a rate of 0.95 cm³/minute. The contents of the second reactor were maintained at 170° C. When 1500 cm³ had been added to the second reactor, the outlet valve was opened and the resin was fed to a collection vessel at a rate that maintained a constant fill level, resulting in a 15 minute residence time. The resulting hyperbranched acrylic polymer had a solids content of 80.9%. A hyperbranched acrylic polymer aqueous dispersion was prepared from the following mixture of ingredients as described in Table 20:

TABLE 20

Dispersion Preparation

| Ingredients | Parts by Weight (grams) |
|---|---|
| Charge I | |
| Hyperbranched acrylic polymer of Example 1 | 1237.5 |
| n-butyl methacrylate | 23.72 |
| Dimethyl ethanolamine | 4.96 |
| SOLSPERSE ® 46000 (a dispersant available commercially from Lubrizol) | 3.08 |
| Precipitated Silica | 276.69 |
| Deionized Water | 790.54 |
| Deionized Water | 205.00 |

The materials were milled in a mini-basket media mill. A portion of the second water addition was added during milling to ensure good viscosity/mixing and the batch was run for 90 minutes before being kicked off. The properties of the dried silica are shown in Table 21:

TABLE 21

PROPERTIES OF SILICA AND POLYMER TREATED SILICA

| Example | Treatment Description | CTAB, m²/g | BET, m²/g | Carbon, wt. % |
|---|---|---|---|---|
| CE-E.1 | None (Comparative) | 176.0 | 195.0 | 0.0 |
| E.2 | Polymer Treated Silica | 154.0 | 47.0 | 24.0 |

The material was mixed in passenger tread I (previously described) and the properties are detailed in Table 22. The higher carbon content for the inventive silica, E.2 indicates that the polymer has in fact been retained on the silica surface.

TABLE 22

PROPERTIES OF RUBBER COMPOUNDS
MODEL PASSENGER FORMULATION I

| | Example | |
|---|---|---|
| | CE-E.1A | E.2A |
| Silica component | CE-E.1 | E.2 |
| Silica, phr | 80.0 | 86.4 |
| Si-69, phr | 10.0 | 0.0 |
| RM Sulfur, phr | 1.4 | 2.0 |
| CBS, phr | 1.7 | 3.0 |

TABLE 22-continued

PROPERTIES OF RUBBER COMPOUNDS
MODEL PASSENGER FORMULATION I

| | Example | |
|---|---|---|
| | CE-E.1A | E.2A |
| DPG, phr | 2.0 | 0.5 |
| Scorch Time (TS2), minutes | 3.4 | 14.7 |
| Cure Time (TC90), minutes | 30.7 | 34.9 |
| $M_L(1 + 4)$, MU | 81.0 | 50.0 |
| $M_H$-$M_L$ | 16.48 | 10.8 |
| Tensile, MPa | 18.2 | 9.8 |
| Elongation | 364.0 | 778 |
| Hardness, Shore A | 63.0 | 59.0 |
| Toughness (Tensile * Elongation), MPa * % | 6625.0 | 7624.0 |
| RDS - temp sweep, 1 Hz, 2% strain | | |
| Tan delta 60° C. | 0.094 | 0.130 |
| Tan delta 0° C. | 0.381 | 0.390 |
| Delta tan delta 0° C. − 60° C. | 0.287 | 0.260 |
| RDS - strain sweep, 30 C., 1 Hz | | |
| G'@ 0.5%, MPa | 3.70 | 3.43 |

In this example, the acrylic polymer treated silica filled rubbed compound, E.2A shows a 31 Mooney unit reduction in viscosity relative to the comparative silica as well as a reduction in the low strain G'. Furthermore, the silica shows improved toughness relative to the comparative silica.

Example F

Approximately 2000 g of an approximately 7% solids silica slurry was added to a 5 L 3-neck flask under mechanical stirring. The reactor temperature was set to 87° C. and 3-mercaptopropyltriethoxysilane was added slowly at 5.5 wt. % relative to the $SiO_2$ solids. After the addition of silane was complete, Genflo 3810, a carboxylated SBR latex was added to the reactor at 6 wt. % relative to $SiO_2$ solids. The pH of the slurry was adjusted to 4.5 using concentrated sulfuric acid. The resulting product was washed on funnels using DI water. The material was reslurried to 12% solids with deionized water. Then the slurry was dried using a mini Buchi spray drier. The inlet temperature was set at 180-185° C., the outlet temperature at 90-92° C. The aspirator was set at 80% and the pump at 22%. The air pressure was 80 psi. The properties of the dried silica are shown in Table 23.

TABLE 23

PROPERTIES OF SILICA AND POLYMER TREATED SILICA

| Example | Treatment Description | CTAB, m²/g | BET, m²/g | Carbon, wt. % |
|---|---|---|---|---|
| CE-F.1 | None (Comparative) | 176.0 | 195.0 | 0.0 |
| F.2 | Latex Treated Silica | 159.0 | 159.0 | 3.4 |

The components in Table 24 were blended and cured using techniques well known in the tire tread compounding art. The properties of the cured rubber compounds are shown in Table 25. The higher carbon content for the inventive silica, F.2 indicates that the latex has in fact been retained on the silica surface

TABLE 24

RUBBER COMPOUND FORMULATIONS*

| | Example | |
|---|---|---|
| | CE-F.1A | F.2A |
| Silica component | CE-F.1 | F.2 |
| Pass 1 | | |
| VSL 5228-2 | 122.12 | 124.09 |
| BR 1207 | 29.61 | 30.09 |
| Silica | 47.38 | 52.00 |
| Si-69 | 8.29 | — |
| Silica | 47.38 | 52.00 |
| Sundex 8125 TN | 5.92 | 6.02 |
| Zinc Oxide | — | 3.01 |
| Stearic Acid | — | 1.20 |
| Santoflex 13 | — | 2.41 |
| Sunproof Improved | — | 1.81 |
| Total Grams: | 260.71 | 272.61 |
| Pass 2 | | |
| Master Batch | 260.71 | — |
| Zinc Oxide (720 C.) | 2.96 | — |
| Stearic Acid | 1.18 | — |
| Santoflex 13 | 2.37 | — |
| Sunproof Improved | 1.78 | — |
| Subtotal Grams: | 8.29 | — |
| Total Grams: | 269.01 | — |
| Mill Finish | | |
| Master Batch | 269.01 | 272.61 |
| RM Sulfur | 1.66 | 2.41 |
| CBS | 2.01 | 3.61 |
| DPG | 2.37 | 0.60 |
| Subtotal Grams: | 6.04 | 6.62 |
| Total Grams: | 275.05 | 279.23 |

*Mixed on Brabender Plasticorder equipped with 2 wing rotors

TABLE 25

PROPERTIES OF RUBBER COMPOUNDS MODEL PASSENGER FORMULATION I

| | Example | |
|---|---|---|
| | CE-F.1A | F.2A |
| Silica component | CE-F.1 | F.2 |
| Silica, phr | 80.0 | 80.0 |
| Si-69, phr | 7.0 | 0.0 |
| RM Sulfur, phr | 1.4 | 2.0 |
| CBS, phr | 1.7 | 3.0 |
| DPG, phr | 2.0 | 0.5 |
| $M_L(1 + 4)$, MU | 79.4 | 96.9 |
| $M_H$-$M_L$ | 24.8 | 23.2 |
| Tensile, MPa | 19.0 | 16.6 |
| Elongation | 529.0 | 332.0 |
| Hardness, Shore A | 64.0 | 65.0 |
| Toughness (Tensile * Elongation), MPa * % | 10051 | 5511 |
| RDS - temp sweep, 1 Hz, 2% strain | | |
| Tan delta 60° C. | 0.090 | 0.078 |
| Tan delta 0° C. | 0.315 | 0.331 |
| Delta tan delta 0° C. – 60° C. | 0.225 | 0.298 |
| RDS - strain sweep, 30 C., 1 Hz | | |
| G'@ 0.5%, MPa | 4.04 | 2.5 |

In this example, the latex treated silica reduces the elongation of the compound F.2A relative to the comparative silica filled compound CE-F.1A. The rolling resistance is reduced relative to the comparative silica compound and the wet traction is greater. The low strain G' is also reduced indicating a reduction in filler-filler interaction for the latex treated silica.

Although the present invention has been described with references to specific details of certain embodiments thereof, it is not intended that such details should be regarded as limitations upon the scope of the invention except in so far as they are included in the claims.

What is claimed is:

1. A process for producing treated filler comprising:
   (a) treating a slurry comprising untreated filler wherein said untreated filler has not been previously dried, with a treating composition comprising a treating agent, thereby forming a treated filler slurry; and
   (b) drying said treated filler slurry to produce treated filler, wherein said treating agent comprises a polymer comprising (i) at least one first group that interacts with said untreated filler and (ii) at least one second group that interacts with a rubber matrix into which said treated filler is incorporated, wherein the treating composition further comprises a coupling agent comprising an organosilane selected from the group consisting of (4-chloromethyl-phenyl) trimethoxysilane, (4-chloromethyl-phenyl) triethoxysilane, [2-(4-chloromethyl-phenyl)-ethyl]trimethoxysilane, [2-(4-chloromethyl-phenyl)-ethyl]triethoxysilane, (3-chloro-propenyl)-trimethoxysilane, (3-chloro-propenyl)-triethoxysilane (3-chloro-propyl)-triethoxysilane, (3-chloro-propyl)-trimethoxysilane, trimethoxy-(2-p-tolyl-ethyl)silane, triethoxy(2-p-tolyl-ethyl)silane, and combinations thereof.

2. The process of claim 1, wherein said untreated filler is chosen from aluminum silicate, silica gel, colloidal silica, precipitated silica, and mixtures thereof.

3. The process of claim 1, wherein the filler comprises precipitated silica.

4. The process of claim 1, wherein the polymer is selected from an acrylic polymer, a styrene butadiene latex, a natural rubber latex, or combinations thereof.

5. The process of claim 4, wherein the acrylic polymer is selected from an acrylic random copolymer, an acrylic comb polymer, an acrylic block copolymer, a hyperbranched acrylic polymer, or combinations thereof.

6. The process of claim 5, wherein the hyperbranched acrylic polymer at least partially encapsulates the treated filler.

7. The process of claim 1, wherein the at least one first group is selected from an ester, carboxylic acid, imide, anhydride, diacid, lactone, oxirane, isocyanate, alkoxysilane, hydrolysis products thereof, salts thereof, or combinations thereof.

8. The process of claim 1, wherein the at least one second group is selected from formyl, keto, thiol, sulfido, halo, amino, alkenyl, alkynyl, alkyl, hydrolysis products thereof, salts thereof, or combinations thereof.

9. The process of claim 1, wherein the at least one second group is selected from hydroxyl, anhydride, oxirane, hydrolysis products thereof, salts thereof, or combinations thereof.

10. The process of claim 1, wherein the treatment composition further comprises a non-coupling agent that is different from the treating agent and wherein the non-coupling agent that is different from the treating agent is one or more of a biopolymer, fatty acid, organic acid, polymer emulsion, polymer coating composition, and combinations thereof.

11. The process of claim 1, wherein the treatment composition further comprises a non-coupling agent selected from an anionic surfactant, a nonionic surfactant, an amphoteric surfactant, and combinations thereof, present in an amount of from greater than 1% to 25% by weight based on the weight of untreated filler.

12. The process of claim 1, wherein
the treated filler comprises treated precipitated silica; and
the treating composition further comprises:
a non-coupling agent chosen from anionic, nonionic and/or amphoteric surfactants, which is present in an amount of from greater than 1% to 25% by weight based on the weight of untreated filler.

13. A process for producing treated precipitated silica comprising:
(a) combining an alkali metal silicate and an acid to form a slurry comprising untreated silica;
(b) treating said slurry with a treating composition comprising a treating agent, thereby forming a treated slurry; and
(c) drying said treated slurry to produce a treated precipitated silica,
wherein said treating agent comprises a polymer comprising (i) at least one first group that interacts with said untreated silica and (ii) at least one second group that interacts with a rubber matrix into which said treated silica is incorporated,
wherein the treating composition further comprises a coupling agent comprising an organosilane, selected from the group consisting of (4-chloromethyl-phenyl) trimethoxysilane, (4-chloromethyl-phenyl) triethoxysilane, [2-(4-chloromethyl-phenyl)-ethyl]trimethoxysilane, [2-(4-chloromethyl-phenyl)-ethyl]triethoxysilane, (3-chloro-propenyl)-trimethoxysilane, (3-chloro-propenyl)-triethoxysilane, (3-chloro-propyl)-triethoxysilane, (3-chloro-propyl)-trimethoxysilane, trimethoxy-(2-p-tolyl-ethyl)silane, triethoxy-(2-p-tolyl-ethyl)silane, and combinations thereof.

14. The process of claim 13, wherein the polymer is selected from an acrylic polymer, a styrene butadiene latex, a natural rubber latex, or combinations thereof.

15. The process of claim 14, wherein the acrylic polymer is selected from an acrylic random copolymer, an acrylic comb polymer, an acrylic block copolymer, a hyperbranched acrylic polymer, or combinations thereof.

16. The process of claim 15, wherein the hyperbranched acrylic polymer at least partially encapsulates the treated filler.

17. The process of claim 13, wherein the at least one first group is selected from an ester, carboxylic acid, imide, anhydride, diacid, lactone, oxirane, isocyanate, alkoxysilane, hydrolysis products thereof, salts thereof, or combinations thereof.

18. The process of claim 13, wherein the at least one second group is selected from formyl, keto, thiol, sulfido, halo, amino, alkenyl, alkynyl, alkyl, hydrolysis products thereof, salts thereof, or combinations thereof.

19. The process of claim 13, wherein the at least one second group is selected from hydroxyl, anhydride, oxirane, hydrolysis products thereof, salts thereof, or combinations thereof.

20. The process of claim 13, wherein said alkali metal silicate comprises aluminum silicate, lithium silicate, sodium silicate, and/or potassium silicate.

21. The process of claim 13, wherein the treatment composition further comprises a non-coupling agent selected from an anionic surfactant, a nonionic surfactant, an amphoteric surfactant, and combinations thereof, present in an amount of from greater than 1% to 25% by weight based on the weight of untreated filler.

22. A process for producing a treated precipitated silica comprising:
(a) combining an alkali metal silicate and an acid to form an untreated slurry comprising untreated silica;
(b) drying the untreated slurry to produce dried precipitated silica;
(c) forming an aqueous slurry of the dried precipitated silica with a treating composition comprising a treating agent, a coupling agent, and optionally, a non-coupling agent, to form a treated precipitated silica slurry; and
(d) drying the treated precipitated silica slurry to produce a dried treated precipitated silica,
wherein said treating agent comprises a polymer comprising (i) at least one first group that interacts with said untreated silica and (ii) at least one second group that interacts with a rubber matrix into which said treated silica is incorporated, and
wherein said coupling agent of said treating composition comprises an organosilane selected from the group consisting of (4-chloromethyl-phenyl) trimethoxysilane, (4-chloromethyl-phenyl) triethoxysilane, [2-(4-chloromethyl-phenyl)-ethyl]trimethoxysilane, [2-(4-chloromethyl-phenyl)-ethyl]triethoxysilane, (3-chloro-propenyl)-trimethoxysilane, (3-chloro-propenyl)-triethoxysilane, (3-chloro-propyl)-triethoxysilane, (3-chloro-propyl)-trimethoxysilane, trimethoxy-(2-tolyl-ethyl)silane, triethoxy-(2-p-tolyl-ethyl)silane and combinations thereof.

23. The process of claim 22, wherein the polymer is selected from an acrylic polymer, a styrene butadiene latex, a natural rubber latex, or combinations thereof.

24. The process of claim 23, wherein the acrylic polymer is selected from an acrylic random copolymer, an acrylic comb polymer, an acrylic block copolymer, a hyperbranched acrylic polymer, or combinations thereof.

25. The process of claim 24, wherein the hyperbranched acrylic polymer at least partially encapsulates the treated filler.

26. The process of claim 22, wherein the at least one first group is selected from an ester, carboxylic acid, imide, anhydride, diacid, lactone, oxirane, isocyanate, alkoxysilane, hydrolysis products thereof, salts thereof, or combinations thereof.

27. The process of claim 22, wherein the at least one second group is selected from formyl, keto, thiol, sulfido, halo, amino, alkenyl, alkynyl, alkyl, hydrolysis products thereof, salts thereof, or combinations thereof.

28. The process of claim 22, wherein the at least one second group is selected from hydroxyl, anhydride, oxirane, hydrolysis products thereof, salts thereof, or combinations thereof.

* * * * *